(12) United States Patent
Miyake et al.

(10) Patent No.: US 7,185,418 B2
(45) Date of Patent: Mar. 6, 2007

(54) STACKED STATOR CORE AND METHOD OF MANUFACTURING THEREOF, AND ROTARY MOTOR AND METHOD OF MANUFACTURING THEREOF

(75) Inventors: Nobuaki Miyake, Tokyo (JP); Akio Matsui, Tokyo (JP); Yuji Nakahara, Tokyo (JP); Yasuyuki Nakanishi, Tokyo (JP); Akira Hashimoto, Tokyo (JP); Masaya Motohashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 488 days.

(21) Appl. No.: 10/673,320

(22) Filed: Sep. 30, 2003

(65) Prior Publication Data

US 2004/0061413 A1    Apr. 1, 2004

Related U.S. Application Data

(62) Division of application No. 10/111,701, filed as application No. PCT/JP01/07309 on Aug. 27, 2001, now Pat. No. 6,784,587.

(30) Foreign Application Priority Data

Aug. 29, 2000   (JP) ............................. 2000-258286

(51) Int. Cl.
*H02K 15/02* (2006.01)
*H02K 15/085* (2006.01)

(52) U.S. Cl. ........................... 29/606; 29/596; 29/605; 310/218

(58) Field of Classification Search ................ 29/596, 29/598, 605, 606; 310/218, 259, 216; 242/432–433.4
See application file for complete search history.

(56) References Cited

U.S. PATENT DOCUMENTS

| | | | | |
|---|---|---|---|---|
| 3,783,318 A | * | 1/1974 | Widstrand | 310/216 |
| RE28,960 E | * | 9/1976 | Tharman | 29/596 |
| 4,116,033 A | | 9/1978 | Iwaki et al. | |
| 4,365,180 A | * | 12/1982 | Licata et al. | 310/216 |
| 4,835,839 A | * | 6/1989 | Forbes et al. | 29/596 |
| 5,451,306 A | * | 9/1995 | Nakamura et al. | 204/503 |

(Continued)

FOREIGN PATENT DOCUMENTS

GB        1 477 005         6/1977

(Continued)

*Primary Examiner*—A. Dexter Tugbang
*Assistant Examiner*—Livius R. Cazan
(74) *Attorney, Agent, or Firm*—Buchanan Ingersoll & Rooney PC

(57) ABSTRACT

The present invention relates to a structure of a stacked stator core formed when rotary motors are manufactured and to a method of manufacturing the stacked stator core. It is possible to improve the workability in the winding process and the productivity of the stator and the rotary motor because the stacked stator core includes a plurality of stator cores 300, each of which is made up of a prescribed number of stacked sheet magnetic materials, a plurality of yoke members 301 forming each stator core, a bendable bent portion 304 provided between the yoke members, and an interconnecting portion 401 for connecting the plurality of stator cores 300 one another while providing a difference in level, by connecting the top end of one stator core with the bottom end of the other stator core.

8 Claims, 37 Drawing Sheets

U.S. PATENT DOCUMENTS

| | | |
|---|---|---|
| 5,694,679 A | 12/1997 | Sassi |
| 5,859,486 A * | 1/1999 | Nakahara et al. ............ 310/254 |
| 5,986,377 A * | 11/1999 | Yamada et al. ............. 310/216 |
| 6,121,711 A * | 9/2000 | Nakahara et al. ............ 310/254 |
| 6,127,753 A * | 10/2000 | Yamazaki et al. ............. 310/71 |
| 6,167,610 B1 | 1/2001 | Nakahara et al. |
| 6,323,571 B1 | 11/2001 | Nakahara et al. |
| 6,362,553 B1 | 3/2002 | Nakahara et al. |
| 6,369,687 B1 | 4/2002 | Akita et al. |

FOREIGN PATENT DOCUMENTS

| | | |
|---|---|---|
| JP | 57-100823 | 6/1982 |
| JP | 60-46620 | 10/1985 |
| JP | 08-019196 | 1/1996 |
| JP | 08-275468 | 10/1996 |
| JP | 09-308143 | 11/1997 |
| JP | 11-98774 | 4/1999 |
| JP | 11-346447 | 12/1999 |
| JP | 2000-152525 | 5/2000 |
| JP | 2000-184630 | 6/2000 |
| JP | 2000-201458 | 7/2000 |

* cited by examiner

STACKED STATOR CORE AND METHOD OF MANUFACTURING THEREOF, AND ROTARY MOTOR AND METHOD OF MANUFACTURING THEREOF

This application is a divisional of application Ser. No. 10/111,701, filed Apr. 29, 2002, now U.S. Pat. No. 6,784,587 which in turn is a §371 application of PCT/JP01/07309, filed Aug. 27, 2001.

BACKGROUND OF THE INVENTION

1. Field of the Invention

The present invention relates to a rotary motor and a stator used for driving a medium used in a magnetic disk drive unit, optical disk drive unit or the like. More particularly, the present invention relates to the structure of the rotary motor and the stator in order to improve the mass productivity and to a method of manufacturing thereof.

2. Description of Related Art

A conventional rotary motor stator of this type (not shown) manufactured by stacking a plurality of ring-shaped board members blanking directly from a steel board, as disclosed in JP-A-100823/1982, for instance. However, yield of materials is low. For this reason, JP-B-46620/1985 discloses the improved yield by winding a belt-shaped board member with a large number of teeth in spiral while plastically deforming the board member to fasten a several layers by welding the respective layers.

As an another conventional method of manufacturing the rotary motor, there is a method disclosed in JP-A-98774/1999. FIGS. 48 and 49 are a view showing such a method.

Referring to FIGS. 48 and 49, the method involves feeding a strip-shaped magnetic material 500 to a press machine 502 through a work feeding machine 501, forming a core member 503 consists of thinned portions 503a, yoke members 503b, and magnetic pole teeth 503c, forming ring-shaped stacked yoke members 505 by winding a reel 504 by a plurality of turns such that the core member 503 corresponding to a plurality of stator cores are arranged during one turn, winding driving coils 506, dividing ring-shaped stacked yoke member 505 into blocks such that a stator core 507 corresponding to one rotary motor is provided, and producing stators for rotary motors by bending the stator core 507 with a tool.

The conventional rotary motor stators are constructed as above. Thus, the stator disclosed in JP-A-100823/1982 has not only the low yield of materials as mentioned above, but also is heavy to assemble thereof as the assembly forces a great number of the board members to be grasped one by one for conveyance. The stator disclosed in JP-B-46620/1985 has a difficulty in unfolding and dividing the stators for winding as the belt-shaped board member is wound up in spiral while plastically deforming. Regardless, they lack productivity.

Moreover, the method of manufacturing rotary motors disclosed in JP-A-98774/1999 has also the following problems.

(1) The diameter of connected stator cores 507 is very large compared with the thickness of stacked yoke member 505 for the reason that stator cores 507 corresponding to a plurality of rotary motors are connected in the circumferential direction. Therefore, the stacked yoke members 505 are apt to sag, which makes worse handling of stacked yoke members 505 in coating them with insulation coating and placing them onto the winding machine.

(2) It is difficult to provide a positioning portion for mounting the stator core 507 on the rotary motor and a stator-connecting for forming the stator core 507 in a ring and holding it for the reason that the yoke members having the same shape are continuously produced and they are wound up.

(3) The magnetic pole teeth 503c are stacked on the slant for the reason that the strip-shaped magnetic material 500 is provided with yoke members and the strip-shaped magnetic material 500 is wound up in a spiral form around a reel to form stacked yoke members 505. As a result, this incurs the deteriorated productivity in the winding process, and the decreased driving torque of the rotary motor and the torque ripple thereof.

The present invention has been made to solve the above problems. An object of the invention is to provide a stacked stator core capable of improving the workability in the winding process and the productivity of the product and a method of manufacturing the stator, and a rotary motor equipped with the stator and a method of manufacturing the rotary motor.

SUMMARY OF THE INVENTION

The stacked stator core to according to the present invention includes a first core member formed by stacking a prescribed number of magnetic materials and made up of a plurality of yoke members connected to one another through a bendable bent portion; a second core member formed by stacking the prescribed number of magnetic materials and made up of a yoke member arranged in such a manner that one end of each magnetic material of the second core member is successively connected to the other end of the first core member through a bendable bent portion from the next magnetic material of the other end of the first core member by shifting entirely the second core member downwards, with left the same number of stages of one end of the second core member unconnected as the prescribed number of stages; a third core member formed by stacking the prescribed number of magnetic materials, each of which is made up of the same number of yoke members as the first core member connected through the bendable bent portion, and one end of the magnetic material of the third core member is connected to the other end of the second core member through a bendable bent portion by shifting entirely the third core member downwards; and a fourth core member formed by stacking the prescribed number of magnetic materials and made up of a yoke member arranged in such a manner that one end of each magnetic material of the fourth core member is successively connected to the next stage of the other end of the third core member through a bendable bent portion from the next magnetic material of the other end of the third core member by shifting entirely the fourth core member downwards, with left the same number of stages of one end of the fourth core member unconnected as the prescribed number of sages; wherein the first, the second, the third and the fourth core members are independently arranged in a ring and mutually stacked.

This provides a stacked stator core able to easily unfold and divide winding.

The method of manufacturing a stator according to the present invention, includes the steps of forming the stacked stator core by blanking a magnetic material of claim 1 using a progressive die; unfolding the stacked stator core straight; subjecting the straight stacked stator core to a prescribed treatment; winding a wire around the straight stacked stator core subjected to the prescribed treatment; and winding up the straight wire-wound stacked stator core to restore the core to its original arrangement in a ring.

This provides a method of manufacturing a stator able to improve the workability in the winding process and the mass productivity.

The method of manufacturing a stacked stator core according to the present invention includes a plurality of stator cores, each of which is made up of a prescribed number of stacked sheet magnetic materials; a plurality of yoke members forming each stator core; a bendable bent portion provided between the yoke members; and an interconnecting portion for interconnecting the plurality of stator cores by connecting the upper end of one stator core to the lower end of the other stator core with a difference in level provided between the plurality of stator cores.

This provides a stator core able to easily unfold and divide wiring.

The method of manufacturing a rotary core according to the present invention includes a stator connected both ends of the stator core by bending a stator core in a ring having a plurality of stator cores, each made up of a prescribed number of stacked sheet magnetic materials; a plurality of yoke members forming each the stator core; a bendable bent portion provided between the yoke members; and an interconnecting portion for interconnecting the plurality of stator cores by connecting the upper end of one stator core to the lower end of the other stator core with a difference in level provided between the plurality of stator cores; and a base member equipped with the stator core.

This provides a rotary motor superior in the mass productivity.

The disk drive unit according to the present invention includes a stator core divided from a stacked stator core provided with a plurality of stator cores, each stator core makde up of a prescribed number of stacked sheet magnetic materials; a plurality of yoke members forming each stator core; a bendable bent portion provided between the yoke members; an interconnecting portion for interconnecting the plurality of stator cores by connecting the top of one stator core to the bottom of the other stator core with a difference in level provided between the plurality of stator cores; and a portion for reading and writing data from and to magnetic recording media rotated by the rotary motor.

This provides a slim and low-cost disk drive unit.

The method of manufacturing a rotary motor according to the present invention includes the steps of stacking a prescribed number of ring-shaped sheet magnetic materials provided with a plurality of yoke members and having a first divided portion at one place between the yoke members and a bent portion at the other place therebetween, such that each first divided portion is placed at the same position; stacking a prescribed number of sheet magnetic materials such that second divided portions thereof are placed with a prescribed number shifted by a unit of yoke members in the circumferential direction relative to the prescribed number of stacked sheet magnetic materials; successively stacking the sheet magnetic materials to form a stacked stator core by repeating the two steps as many as a desired number of times; elongating the bent portions of the stacked stator core to unfold the stacked stator core straight; winding driving coils around the magnetic pole teeth provided on the yoke members; dividing the wound yoke members into stator blocks; and forming a ring-shaped stator by bending the divided stator at the bending portion and connecting both ends thereof.

This provides the workability in the winding process and the mass productivity of a stator and rotary motor.

The method of manufacturing a rotary motor according to the present invention includes stacking a prescribed number of ring-shaped sheet magnetic materials provided with a plurality of yoke members and having a bent portion between the yoke members and a first divided portion in the vicinity of one the bent portion, such that each first divided portion is placed at the same position; stacking a prescribed number of sheet magnetic materials having a second divided portion at the position opposed to the first divided portion through the bent portion on the stacked sheet magnetic materials, such that each second divided portion is placed at the same position; stacking a prescribed number of sheet magnetic materials such that third divided portions thereof are positioned with a prescribed number shifted by a unit of yoke members in the circumferential direction relative to the prescribed number of stacked sheet magnetic materials having the second divided portion; successively stacking the sheet magnetic materials to form a stacked stator core by repeating the three steps as many as a desired number of times, elongating the bent portions of the stacked stator core to unfold the stacked stator straight; winding driving coils around the magnetic pole teeth provided on the yoke members; dividing the wound yoke members into stator blocks; and forming a ring-shaped stator by bending the divided stator at the bending portion and connecting both ends thereof.

This improves the workability in the winding process and the mass productivity of a rotary motor.

DETAILED DESCRIPTION OF THE PREFERRED EMBODIMENTS

First Embodiment

Figure 1:
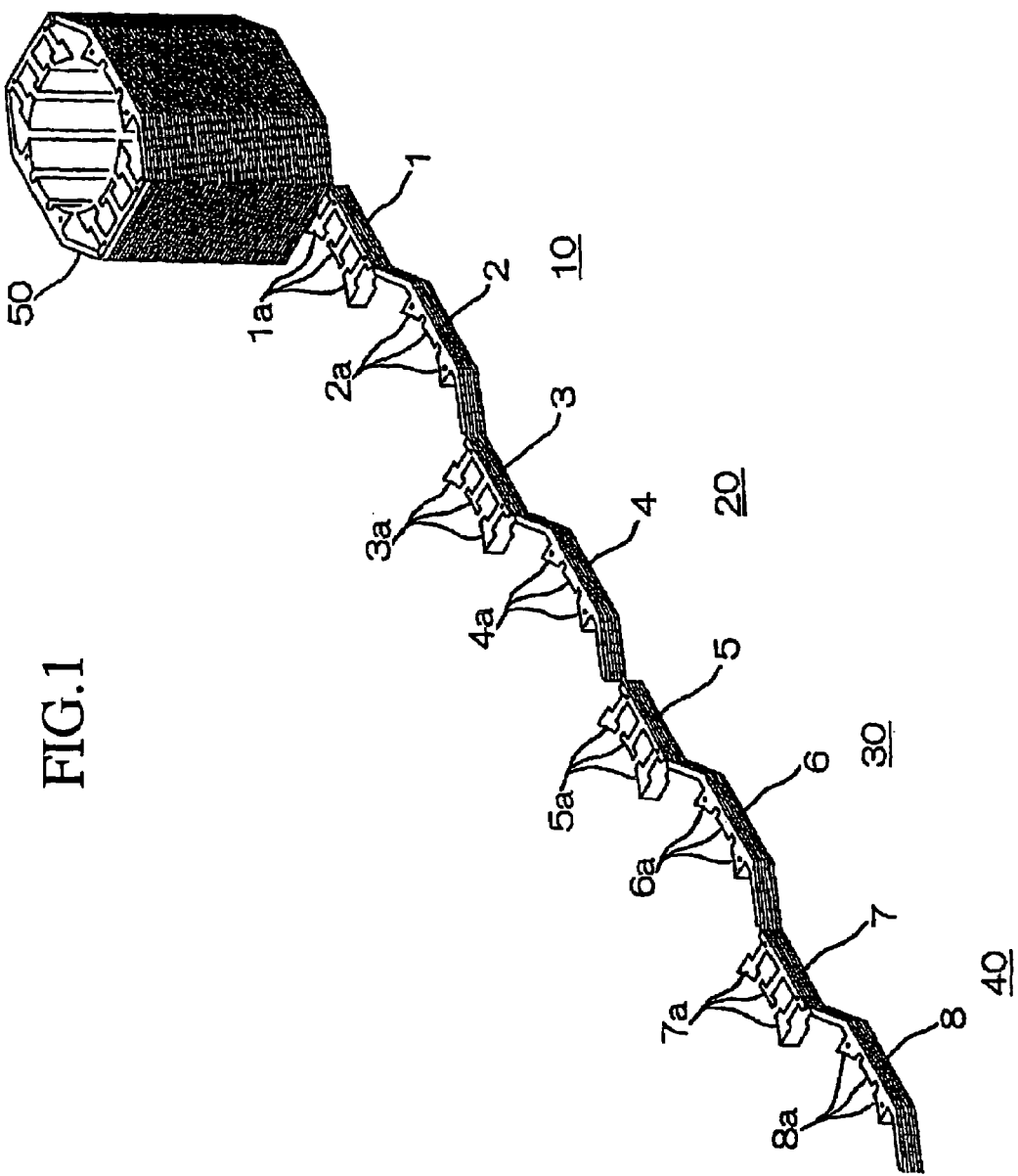
FIG. 1 is a perspective view showing the partially unfolded structure of the stacked stator core according to a first embodiment of the present invention.
Figure 2:
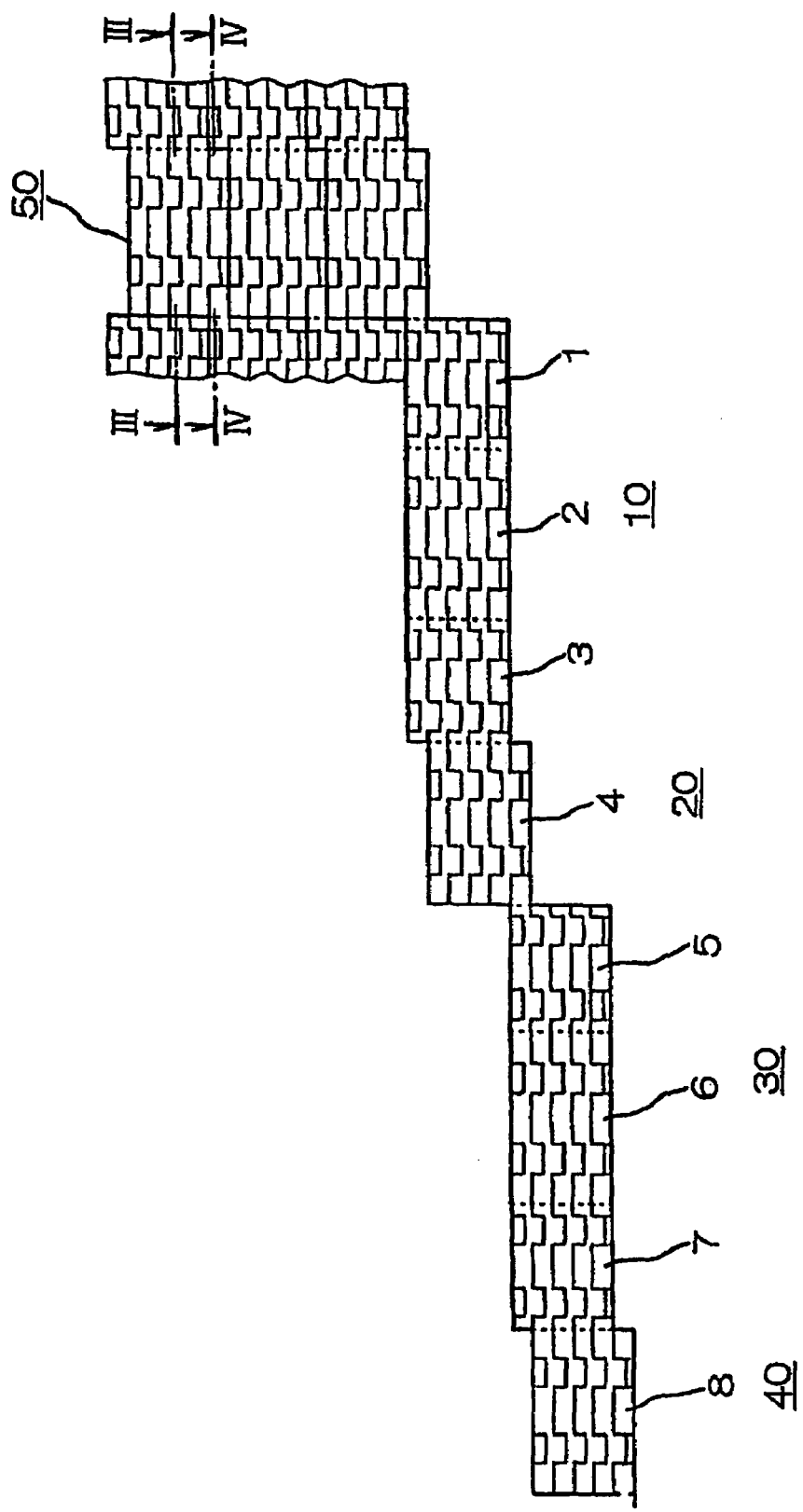
FIG. 2 is a front view showing the partially unfolded structure of the stacked stator core shown in FIG. 1.
Figure 3:
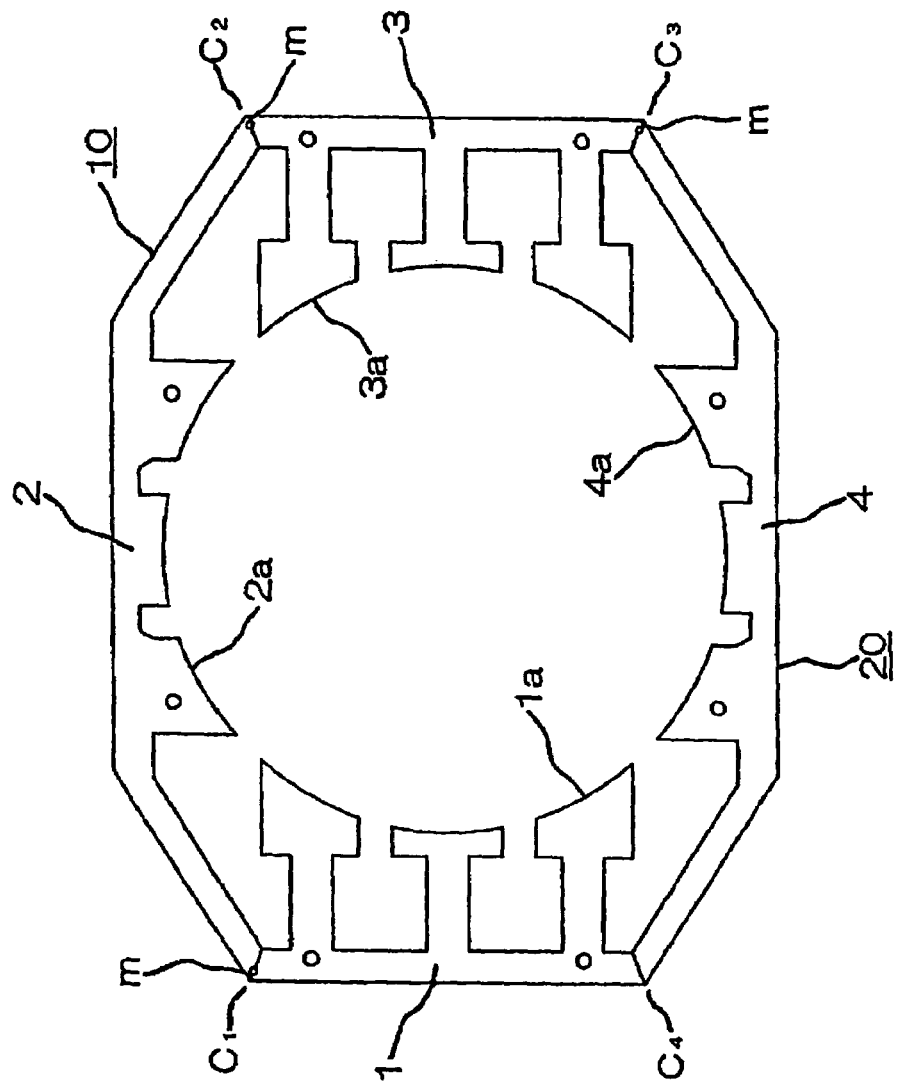
FIG. 3 is a sectional view showing the section taken along line III—III in FIG. 2.
Figure 4:
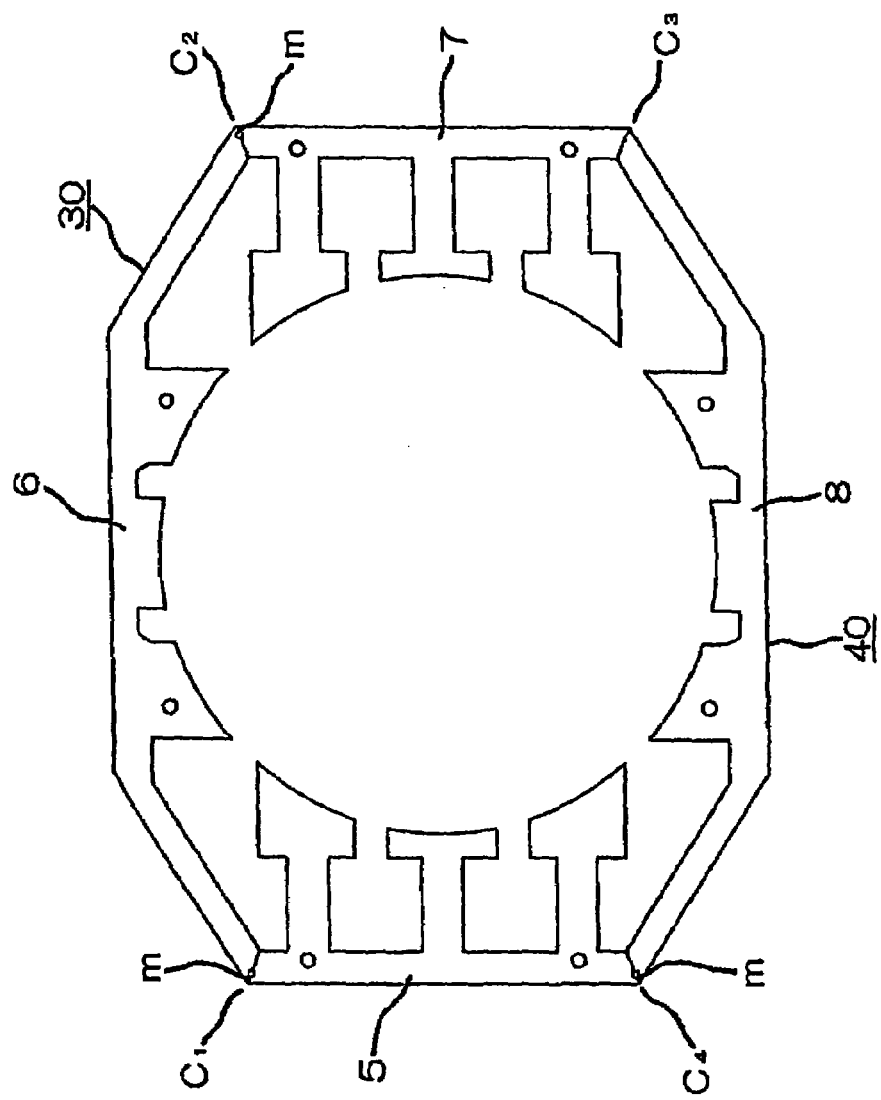
FIG. 4 is a sectional view showing the section taken along line IV—IV in FIG. 2.
Figure 5:
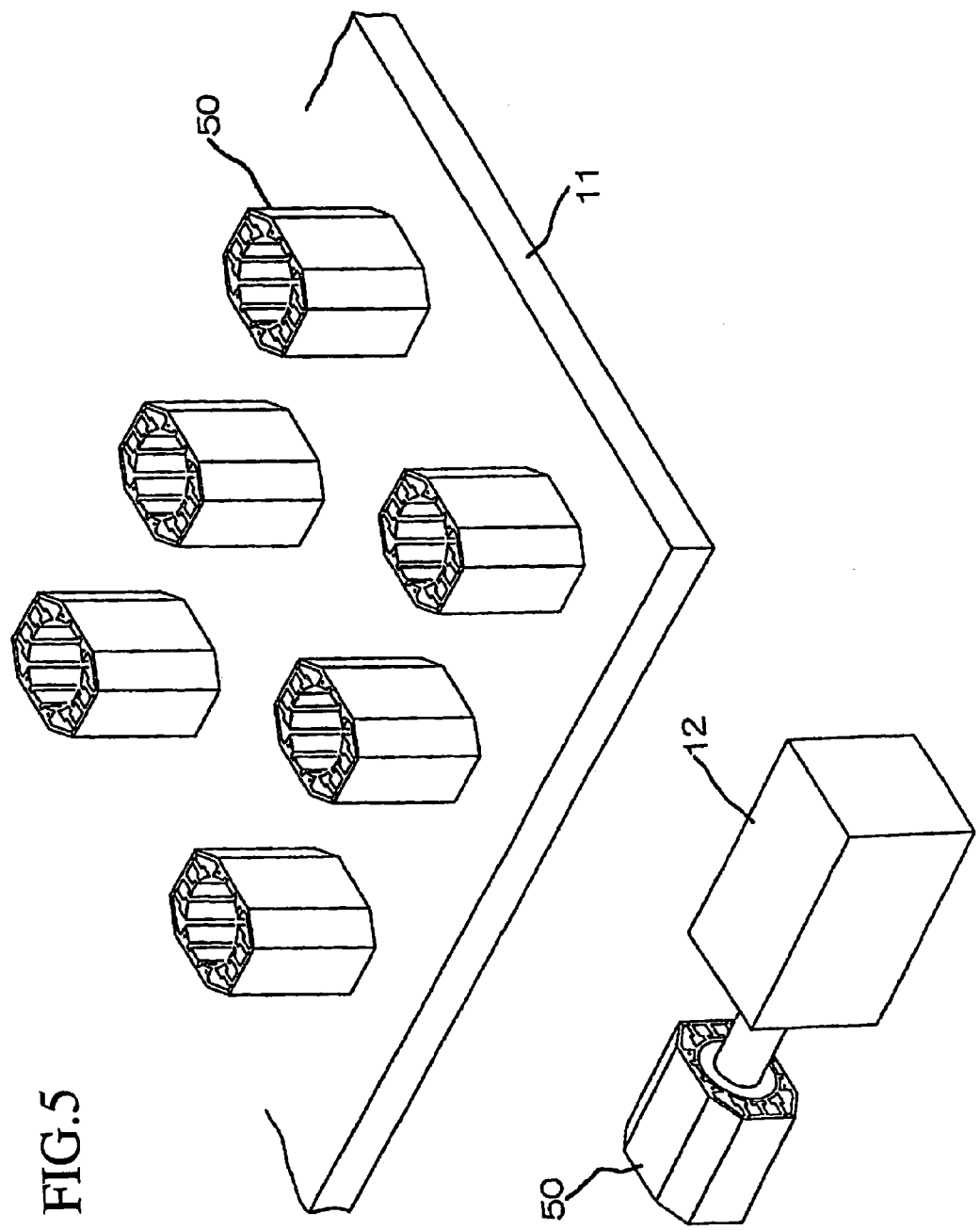
FIG. 5 is a perspective view showing a step of manufacturing the stator by the stacked stator shown in FIG. 1.
Figure 6:
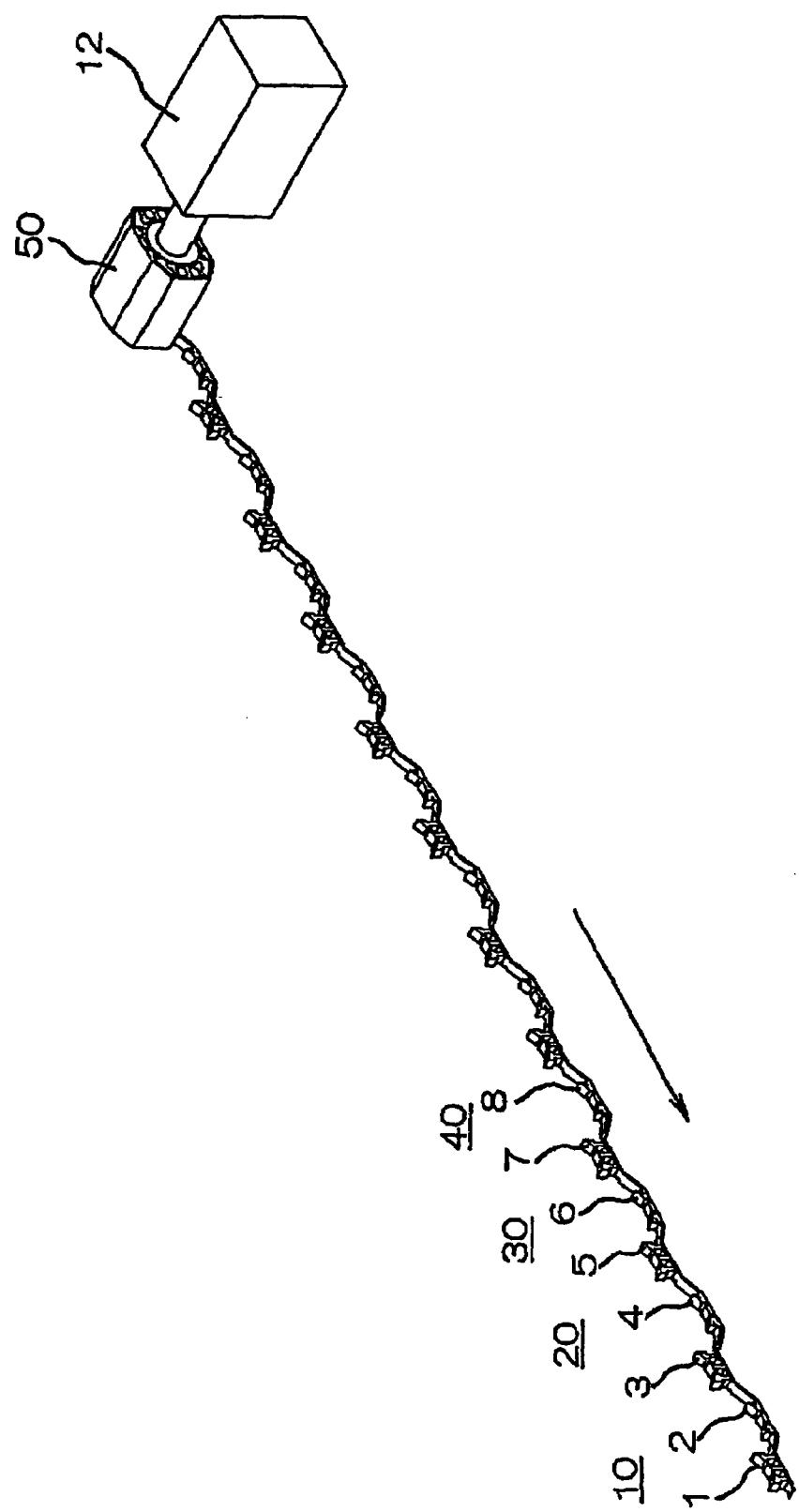
FIG. 6 is a perspective view showing the second step of manufacturing the stator shown in FIG. 5 different from FIG. 5.
Figure 7:
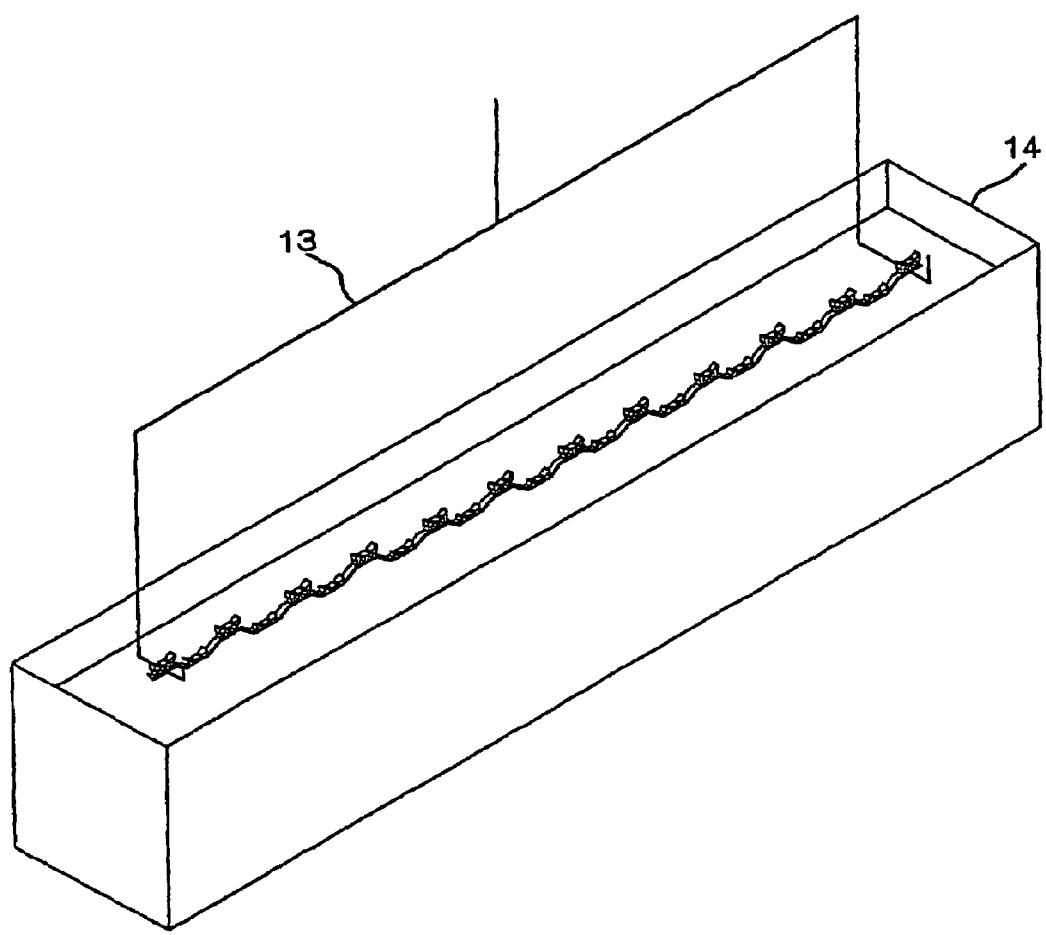
FIG. 7 is a perspective view showing the third step of manufacturing the stator shown in FIG. 5.
Figure 8:
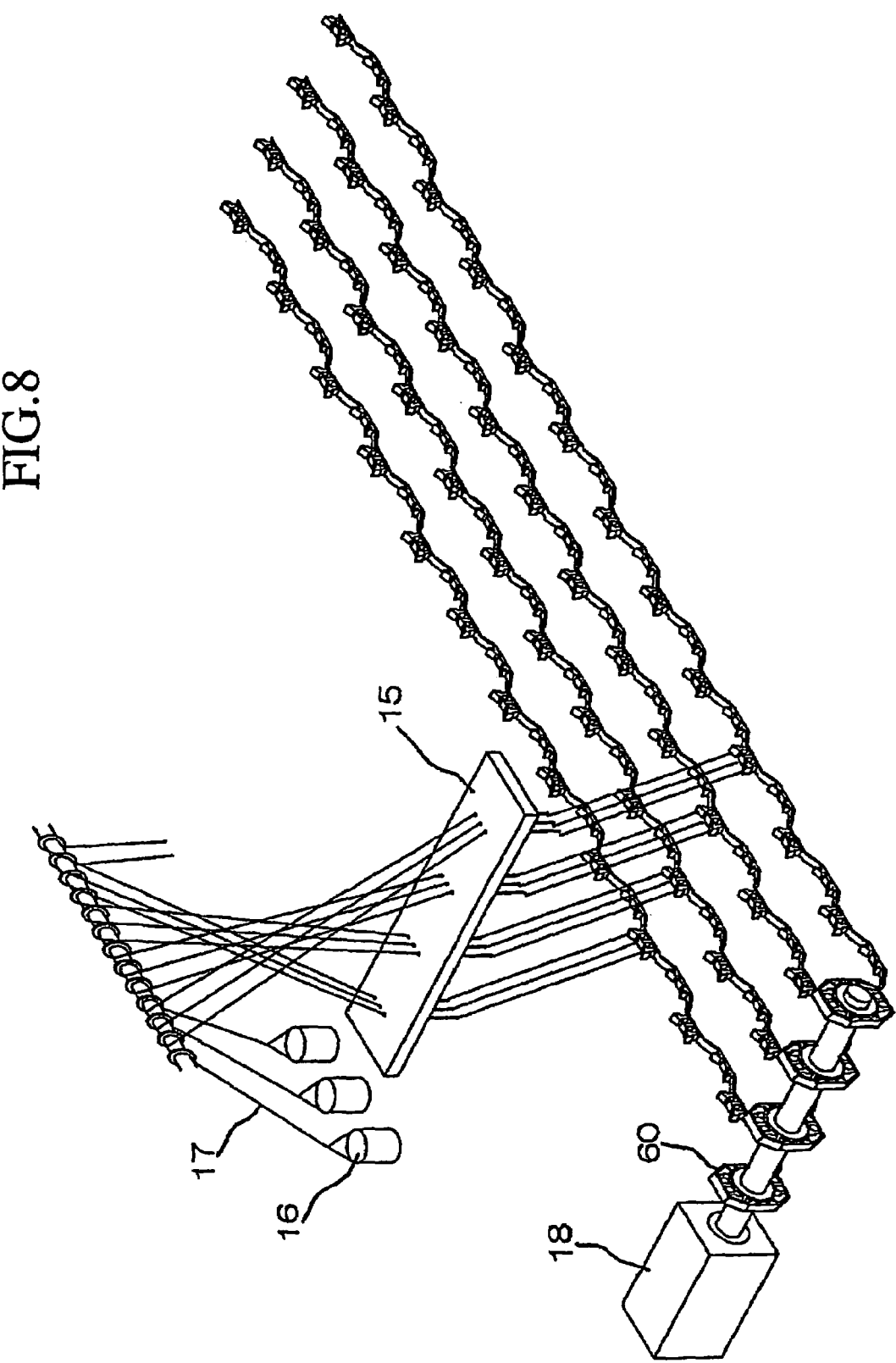
FIG. 8 is a perspective view showing the fourth step of manufacturing the stator shown in FIG. 5.
Figure 9:
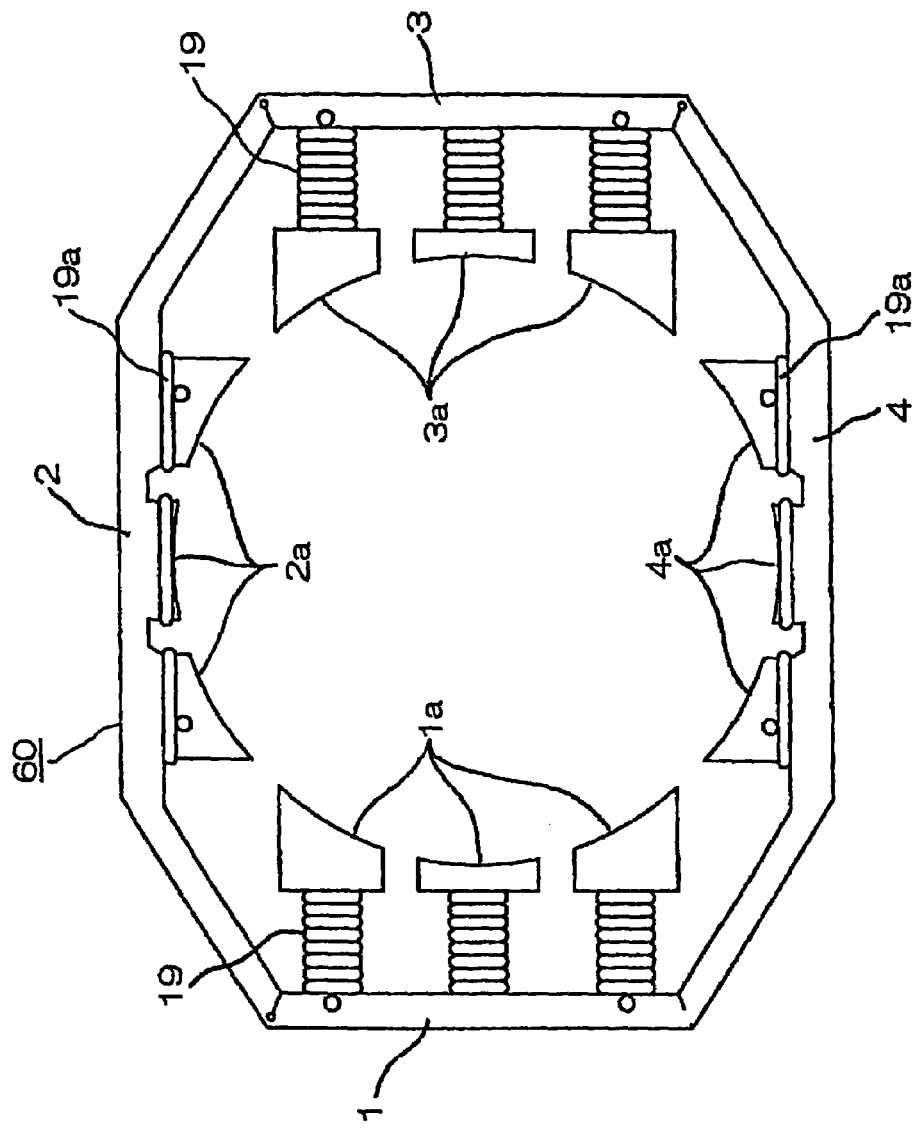
FIG. 9 is a plan view showing the structure of the stator manufactured by going through each step.

The first embodiment of the present invention will next be described with reference to the drawings. FIG. 1 is a partially unfolded perspective view showing the structure of the stacked stator core in the first embodiment of the present invention. FIG. 2 is a front view showing the structure of the stacked stator core shown in FIG. 1. FIG. 3 is a sectional view showing the section taken along line III—III in FIG. 2. FIG. 4 is a sectional view showing the section taken along line IV—IV in FIG. 2. FIG. 5 is a perspective view showing a step of manufacturing the stator by the stacked stator shown in FIG. 1. FIG. 6 is a perspective view showing the second step of manufacturing the stator different from FIG. 5. FIG. 7 is a perspective view showing the third step of manufacturing the stator shown in FIG. 5. FIG. 8 is a perspective view showing the fourth step of manufacturing the stator shown in FIG. 5. FIG. 9 is a plan view showing the structure of the stator manufactured by going through each step.

Referring to the FIGS. 1 to 8, reference numeral 10 denotes a first core member 10 formed by stacking, for instance, five magnetic materials and made up of three yoke members 1, 2 and 3 connected to one another through a thinned portion m as a bendable bent portion. The yoke members 1 and 3 have on one side a plurality of projecting pole teeth 1$a$ and 3$a$, and the yoke member 2 has on one side a plurality of projecting edges 2$a$ for twinning the terminal of a winding to be described later.

Reference numeral 20 denotes a second core member formed by stacking five magnetic materials similar to the first core member 10 and made up of yoke members 4 arranged in such a manner that one end of each magnetic material of the second core member 20 is successively connected to the second stage of the other end of the first core member 10 through a thinned portion m from the second magnetic material of the other end of the first core member 10 by shifting entirely the second core member 20 downwards, with left one stage of one end of the second core member 20 unconnected. The yoke member 4 has on one side a plurality of projecting edges 4a similar to the projecting edges 2$a$ on the yoke member 2.

Reference numeral 30 denotes a third core member formed by stacking five magnetic materials similar to the first and second core members 10 and 20, each of which is made up of three yoke members 5, 6 and 7 as many as the first core member 10 connected through a thinned portion m. One end of the first magnetic material of the third core member 30 is connected to the other end of the last magnetic material of the second core member 20 through a tinned portion m by shifting entirely the third core member 30 downwards. The yoke members 5 and 7 have on one side a plurality of projecting magnetic teeth 5$a$ and 7$a$, and the yoke member 6 has on one side a plurality of projecting edges 6a similar to each projecting edge 2a and 4a.

Reference numeral 40 denotes formed by stacking five magnetic materials similar to the third core member 30 and made up of a yoke member 8 arranged in such a manner that one end of each magnetic material of the fourth core member 40 is successively connected to the second stage of the other end of the third core member 30 through a thinned portion m from the second magnetic material of the other end of the third core member 30 by shifting entirely the fourth core member 40 downwards, with left one stage of one end of the fourth core member 40 unconnected. The yoke member 40 has on one side projecting edges 8a similar to each projecting edge 2a, 4a and 6a. The first, second, third and fourth core members are independently arranged in a ring and mutually stacked.

The method of manufacturing the stacked stator core 50 formed as mentioned above and a stator using this stator core will now be described.

First of all, four sheets of magnetic material are formed by successively forming them into the shape shown in FIG. 3 by blanking using a successive die, and drilled to form small holes in the vicinity of the outer contour of corners C1, C2 and C3 of the corners C1, C2, C3 and C4. Then, slits are formed by cutting and bending the material between the small holes and the inner contour to form a bendable thinned portion m between the small holes and the outer contour in each corner. Also, in corner C4, a slit is formed between the outer and inner contours by cutting and bending the material to from the slit running from the inner contour to the outer contour.

Secondly, in the same manner as the above, one sheet of magnetic material is formed into the shape shown in FIG. 4, by further stacking it on the magnetic material as mentioned above, and drilled to form small holes in the vicinity of the outer contour of corners C1, C2 and C4 out of the corners C1, C2, C3 and C4. Then, slits are formed by cutting and bending the material between the small holes and the inner contour to form a bendable thinned portion m between the small holes and the outer contour in each corner. Also, in corner C3, a slit is formed between the outer and inner contours by cutting and bending the material to form the slit running from the inner contour to the outer contour. Then, the stacked magnetic material is caulked at the places marked with a circle in FIGS. 3 and 4 to fix and integrate the magnetic material into the yoke members 5, 6, 7 and 8.

Subsequently, in the same manner as the above, four sheets of magnetic material are formed into the shape shown in FIG. 3, stacked, and drilled to form small holes in the vicinity of the outer contour of corners C1, C2 and C3, out of the corners C1, C2, C3 and C4. Then, slits are formed by cutting and bending the material between the small holes and the inner contour to form a bendable thinned portion m between the small holes and the outer contour in each corner. Also, in corner C4, a slit is formed between the outer and inner contours by cutting and bending the material, to form the slit running from the inner contour to the outer contour.

After that, in the same manner as the above, one sheet of magnetic material having the shape shown in FIG. 4 is formed, further stacked on the stacked magnetic material as mentioned above, and drilled to make small holes in the vicinity of the outer contour of corners C1, C2 and C4 out of the corners C1, C2, C3 and C4. Then, slits are formed by cutting and bending the material between the small holes and the inner contour to form bendable thinned portion m between the small holes and the outer contour in each corner. Also, in corner C3, a slit is formed between the outer and inner contours by cutting and bending the material to form the slit running from the inner contour to the outer contour. Then, the stacked magnetic material is caulked at the places marked with a circle in FIGS. 3 and 4 to fix and integrate the magnetic material into each of yoke members 1, 2, 3 and 4.

As mentioned above, a ring made up of yoke members 5 to 8 and another ring made up of yoke members 1 to 4 are stacked in the state in which the lowest magnetic material of yoke member 4 and the highest magnetic material of yoke member 5 are connected through thinned portion m to finish a stator core 50. In the sate in which a prescribed number of the stacked stator cores 50 are stacked by a predetermined number of stages, the stacked stator cores are taken out of a mold as a block.

Stacked stator cores 50 thus taken out of the mold in the stacked state are transferred to the next process by a pallet 11 as shown in FIG. 5. Then, the stacked stator cores 50 are placed on a tension roller 12, and the core members are successively withdrawn from the uppermost stacked stator cores in the direction indicated by an arrow as shown in FIG. 6 to unfold the stacked stator cores. In the next process, as shown in FIG. 7, the unfolded stacked stator cores are hung by a hanger 13, and dipped in a coating bath 14 to apply electrocoating. Then, the stacked stator core 50 terminated in the electrocoating process in the unfolded state are transferred to the next winding process.

In the winding process, as shown in FIG. 8, a magnet wire 17 drawn out from a receiving drum 16 is wound around the pole teeth 1a, 3a, 5a and 7a by a winding machine 15 in the order of yoke members 1, 3, 5 and 7, and the terminal of the wire is twined around the projecting edges 2a, 4a, 6a and 8a of the yoke members 2, 4, 6, and 8, respectively. Subsequently, the yoke members 1 to 4 are wound up by a winding machine 18 in a ring, and as shown in FIG. 9, by cutting the thinned portion m, through which the magnetic material of the lowest yoke member 4 and the magnetic material of the highest yoke member 5 are connected. A stator 60 is finished, in which a winding 19 is wound around the projecting edges 1a and 3a of the yoke members 1 and 3 respectively, and a terminal 19a is twined around the projecting edges 2a and 4a of yoke members 2 and 4 respectively.

Similarly, stators 60 are finished successively by cutting the thinned portion m connected in the yoke members 5 to 8 and the yoke members 1 to 4 sequence, and successively winding up the yoke members in a ring.

As mentioned above, according to the first embodiment, the stacked stator core 50 is formed by blanking, and cutting and bending processes shown in FIGS. 3 and 4 repeated for every prescribed number of magnetic materials using a progressive die. Then, a plurality of these stacked stator cores are stacked to form a block, and thus formed block of the stacked stator core 50 is withdrawn straight from the block for unfolding. After electrocoating and winding in the unfolded state, the stacked stator core is successively wound up in a ring again to consecutively form stators 60. This facilitates the unfolding of winding, and improves the workability in winding process. At the same time, it provides a stacked stator core capable of increasing mass production and the method of manufacturing thereof.

Naturally, without restricted to the above. Since the bent portion intervening in the yoke members 1 to 8 is formed by a thinned portion m made up of a small hole and a slit, the process therefore becomes easy. Additionally, since the number of the magnetic material connecting the second and the third core members 20 and 30, and the fourth and the first core members 40 and 10 is limited to only one, the cutting process becomes easy when winding up the core as a core in a ring again after the winding process is done. Moreover, since the magnetic materials are blanked and caulked at the same time for every yoke members 1 to 8 when blanking the magnetic materials, the post process can be omitted after integration. This make it possible to improve the workability in the assembly process and mass productivity.

In addition, in the above structure of the stator 60, no winding is wound around the yoke members 2, 4, 6 and 8, and the yoke members function as a so-called magnetic balancer. Even if there is no space for winding the yoke members 2, 4, 6 and 8 by the reason of arrangement of peripheral devices, the stator can be used. Moreover, in the above structure of the stator 60, when the stacked stator core is wound up in a ring after winding, the core is wound such that the side on which the winding 19 is wound faces the inside of the core to implement an inner-rotor type stator 60. Alternatively, the shape of the stacked stator core may be slightly changed for the wound side to face the outside of the core to form an outer-rotor type stator 60.

In the first embodiment, the description is given, assuming that one stator 60 is made up of the first core member 10 and second core member 20. However, it is also possible to consider that as a whole, one stator 60 is formed by one core made up of a prescribed number of stacked sheet magnetic materials, i.e., one stator core used for one rotary motor. In other words, as is apparent from FIG. 2, first of all, four sheet magnetic materials are stacked such that they are completely overlapped; then new one sheet magnetic material is stacked over the four stacked sheet magnetic materials with the new one sheet magnetic material shifted relative to the above four stacked sheet magnetic materials; and subsequently one yoke member of the new four stacked sheet magnetic materials are overlapped over the above overhung part of the one sheet magnetic material. This forms a stacked stator core 50 made up of successively stacked stator cores while holding a prescribed number of stacked layers as a whole.

Second Embodiment

Figure 10:
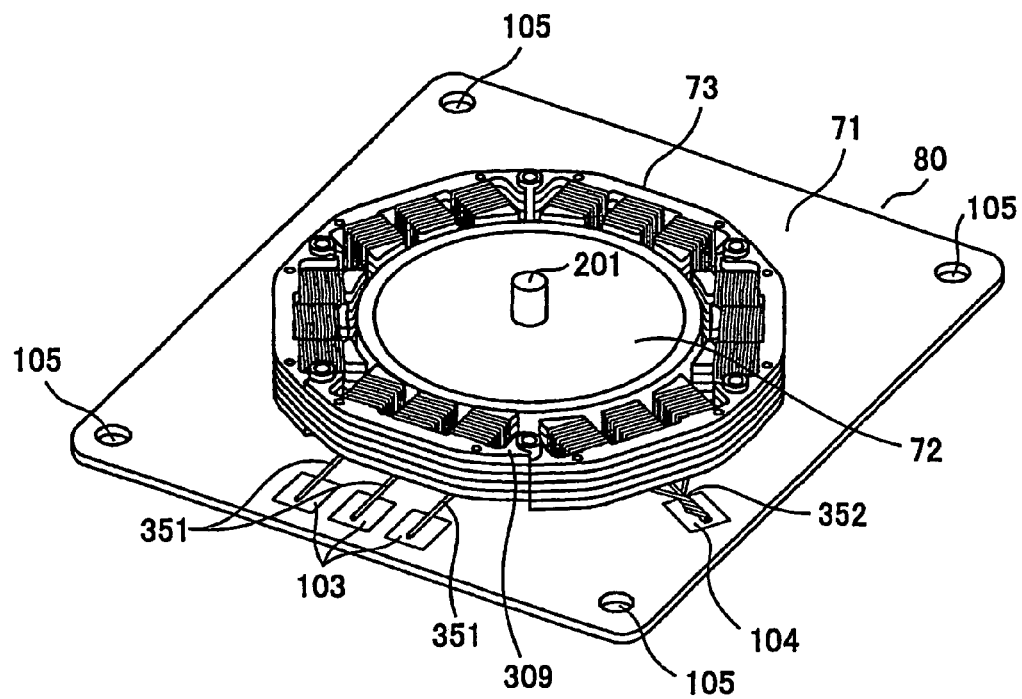
FIG. 10 is a perspective view of the rotary motor.
Figure 11:
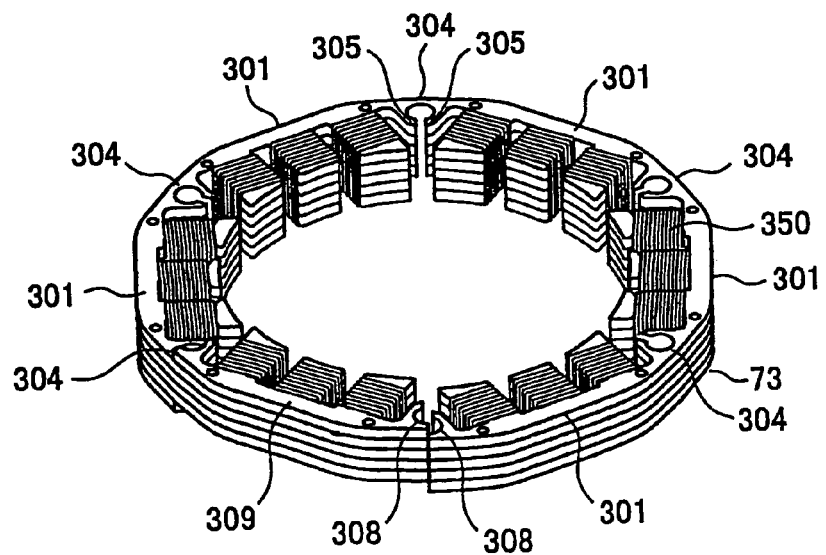
FIG. 11 is a perspective view of the stator used for the rotary motor.
Figure 12:
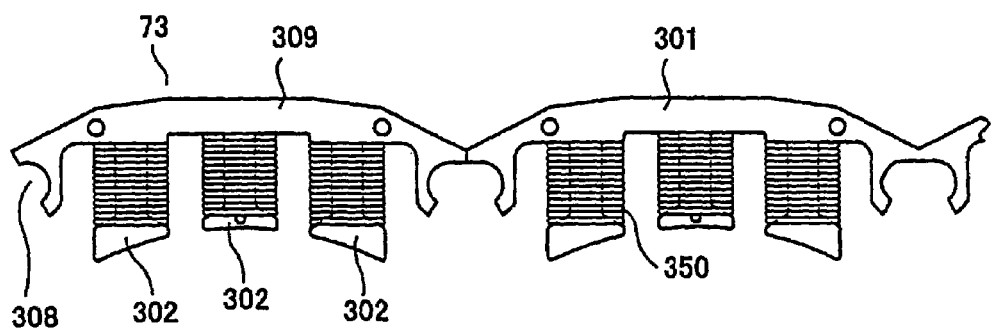
FIG. 12 is a partially enlarged view of the unfolded stator.
Figure 13:
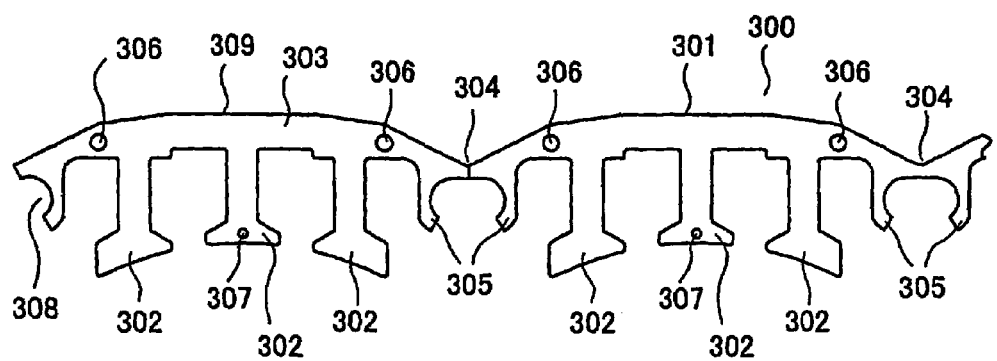
FIG. 13 is a partially enlarged view of the unfolded stator core.
Figure 14:
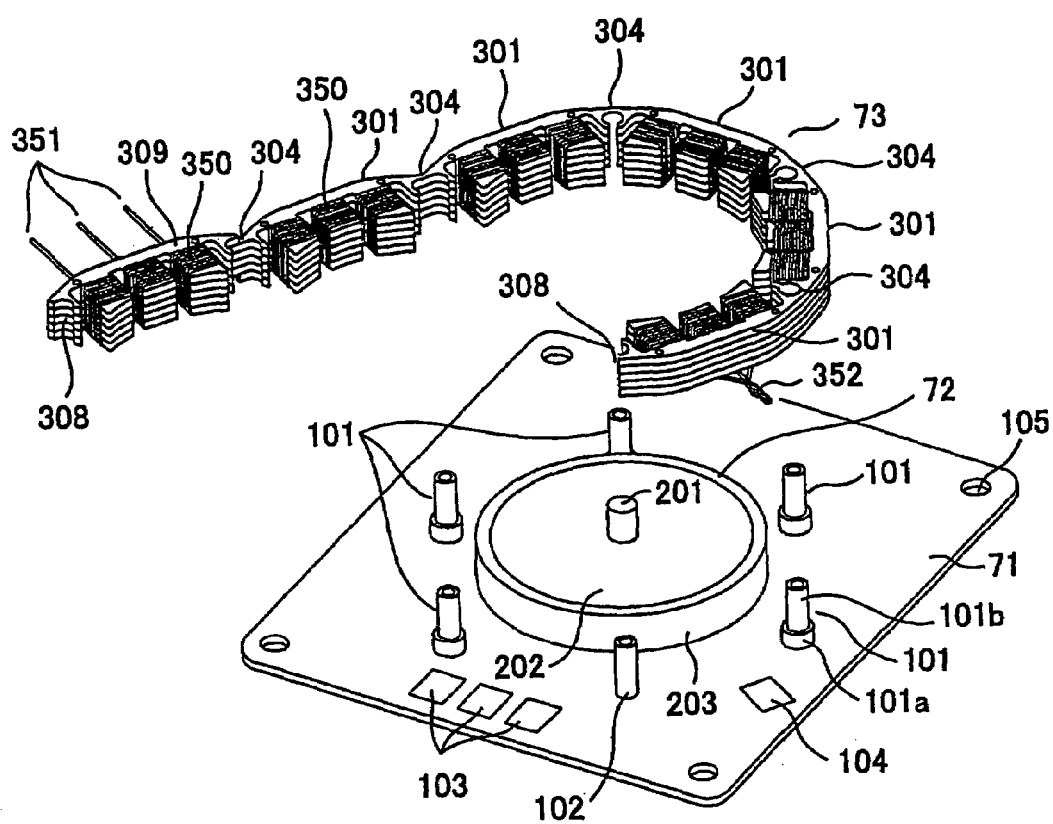
FIG. 14 is an exploded perspective view of the rotary motor.

Second embodiment of the present invention will now be described with reference to FIGS. 10 to 14. FIG. 10 is a perspective view of the rotary motor. FIG. 11 is a perspective view of the stator used for the rotary motor. FIG. 12 is a partially enlarged view of the unfolded stator. FIG. 13 is a partially enlarged view of the unfolded stator core. FIG. 14 is an exploded perspective view of the rotary motor. In FIGS. 10 to 14, reference numeral 71 denotes a base, reference numeral 72 a rotor, and reference numeral 73 a stator.

As shown in FIG. 14, the base 71 is provided with stator fastening pins 101 having a support flange 101*a* and an engaged portion 101*b* to position and fasten the stator 73, a stator supporting pin 102 to position the stator 73, coil terminal lands 103, 104 and base fastening holes 105 for fastening the base 71. A rotor 72 is provided with a shaft 201 engaged and supported by the base 71 in the center of the base 71. The base 71 is pivotally provided with a turntable 202 engaged and fixed by the shaft 201 and a ring-shaped rotor magnet 203 fixed to the periphery of the turntable 202 and magnetized such that the periphery of the rotor magnet 203 has multipole.

As shown in FIGS. 11 to 13, a stator 73 is made up of a stator core 300 formed by stacking sheet magnetic materials and driving coils 350 whose magnetic pole teeth 302 are wound by a wire. In addition, the stator core 300 is provided with yoke members 301 made up of magnetic pole teeth 302 of the number provided in proportion to the number of driving phase and yokes 303 having tooth-shaped magnetic pole teeth 302, a stepped yoke member 309 provided with magnetic pole teeth 302 and yoke 303 similar to other yoke members 301 and having a sheet magnetic material partially not connected with other yoke members 301, bent portions 304 connecting the yoke members, stator positioning protrusions 305 arranged opposed to each other on both sides of the bent portion 304 in the same direction as that of magnetic pole teeth 302, caulkings 306, 307 to fix and integrate the stacked sheet magnetic materials, and core connecting portions 308 provided at the ends of the stator core 300, and a driving coil 350 wound around each magnetic pole teeth 302.

Stator positioning protrusions 305 are provided for forming a hole with which stator fastening pins 101 are engaged when the stator 73 is arranged in a ring as shown in FIGS. 10 and 11. In other words, when the stator 73 is arranged in a ring, one stator positioning protrusion 305 (a first positioning hole) provided at the end of one yoke member 301 and the other stator positioning protrusion 305 (a second positioning hole) provided at the end of the other yoke member 301 adjacent to the one yoke member 301 are bent at the bent portion 304 as a fulcrum, and thereby two stator positioning protrusions 305 move to the position in which the protrusions oppose each other to form a hole to engage with the stator fastening pin 101.

Similarly, core connecting portions 308 are provided to engage the ring-shaped stator 73 with the stator supporting pin 102 in such a manner that a hole is formed with the core connecting portions 308 at both ends of the core opposing each other. Therefore, the engagement of the positioning holes and the stator fastening pins 101 easily fixes the stator 73 on the base 71.

Here, as shown in the sectional view of FIG. 2 in the first embodiment, the stepped yoke members, i.e., the fourth yoke members 4, 8 in FIG. 2 are formed by stacking the same number (five) of sheet magnetic materials as that of the other yoke members, i.e., the first to third yoke members 1 to 3, 5 to 7 in FIG. 2. For this reason, the stepped yoke members are shifted from the other yoke members by one sheet magnetic material in the stacking direction, and a difference in level (projection) is provided relative to the other yoke members.

Coil terminals 351 at one end side of each phase of the driving coils 350 shown in FIG. 10 are led through the lower part of the stepped yoke member 309 and soldered to the coil terminal land 103. Coil terminals at the other end of each phase are twisted, combined and soldered to the coil terminal land 104 as a common coil terminal 352.

In order to arrange the stator 73 in a ring as shown in FIGS. 10 and 11 or straight as shown in FIG. 12, the bent portions 304 are provided at each connecting part between the yoke members so as to make the yoke members 301 or the stepped yoke member 309 bendable. Additionally, each magnetic pole teeth 302 of the yoke members 301 and stepped yoke member 309 are provided so as to make the magnetic pole teeth 302 parallel to each other within each of the yoke members.

A rotary motor 80 so arranged as above can rotate the rotor 72 by feeding a prescribed amount of current to each driving coil 350. Moreover, the provision of the stepped yoke member 309 exerts the moment of a force in the rotor 72 in which the rotation axis 201 inclines toward the stator 73 because the forces of attraction acting on the rotor 72 are different between the yoke members 301 and stepped yoke members 309 in the direction of the rotation axis 201 of the rotor 72. As a result, it is possible to stabilize the rotation of the rotor 72 even when an oscillation or the like is applied to the rotary motor 80.

In addition, the coil terminals 351 are led through the lower part of the stepped yoke member 309 and soldered to the coil terminal lands 103. As a result, the coil terminal 351 can be led through a more larger space than the lower part of the other yoke members 301, improving productivity in wiring.

The method of manufacturing the above rotary motor 80 will now be described.

Figure 15:
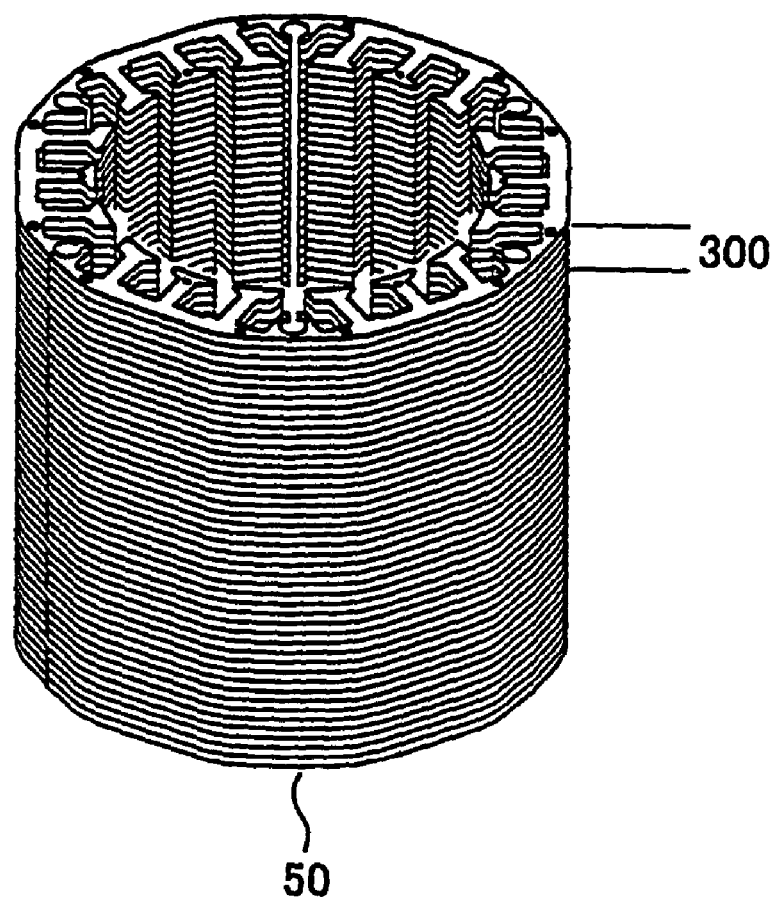
FIG. 15 is a perspective view of the stacked stator core used for the stator core of the rotary motor.
Figure 16:
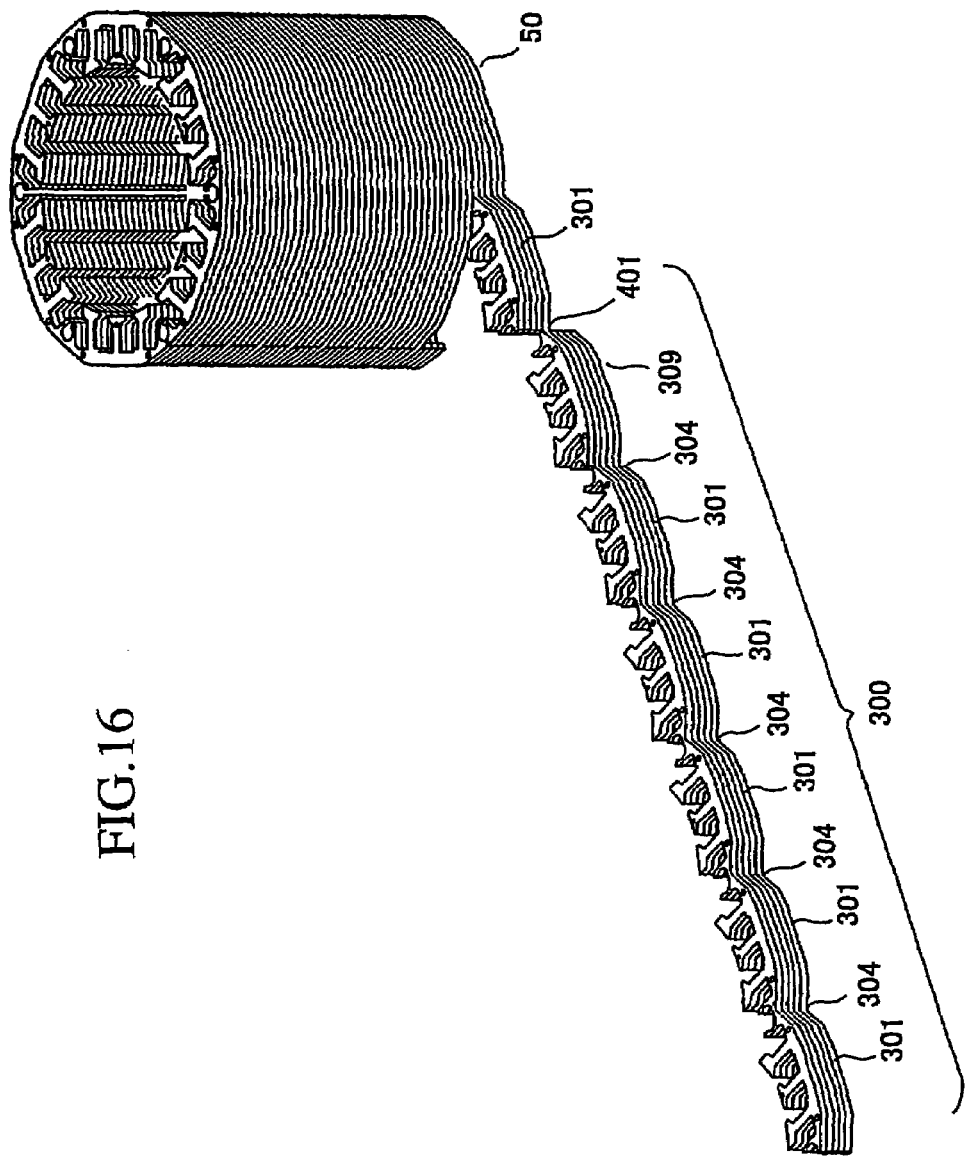
FIG. 16 is a partially unfolded perspective view of the stacked stator core.
Figure 17:
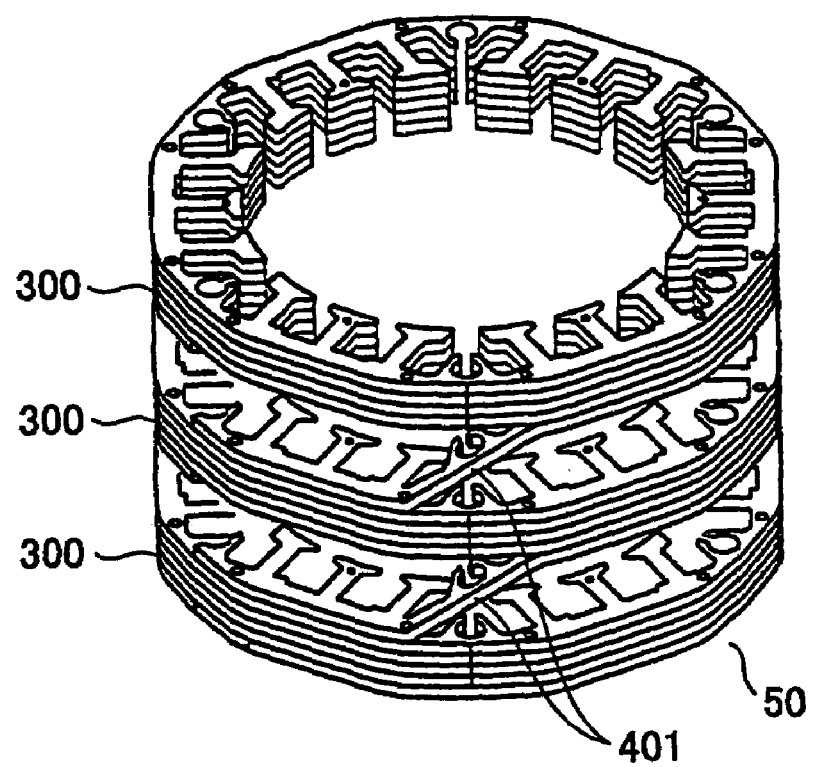
FIG. 17 is a schematic view of the elongated stacked stator core.
Figure 18:
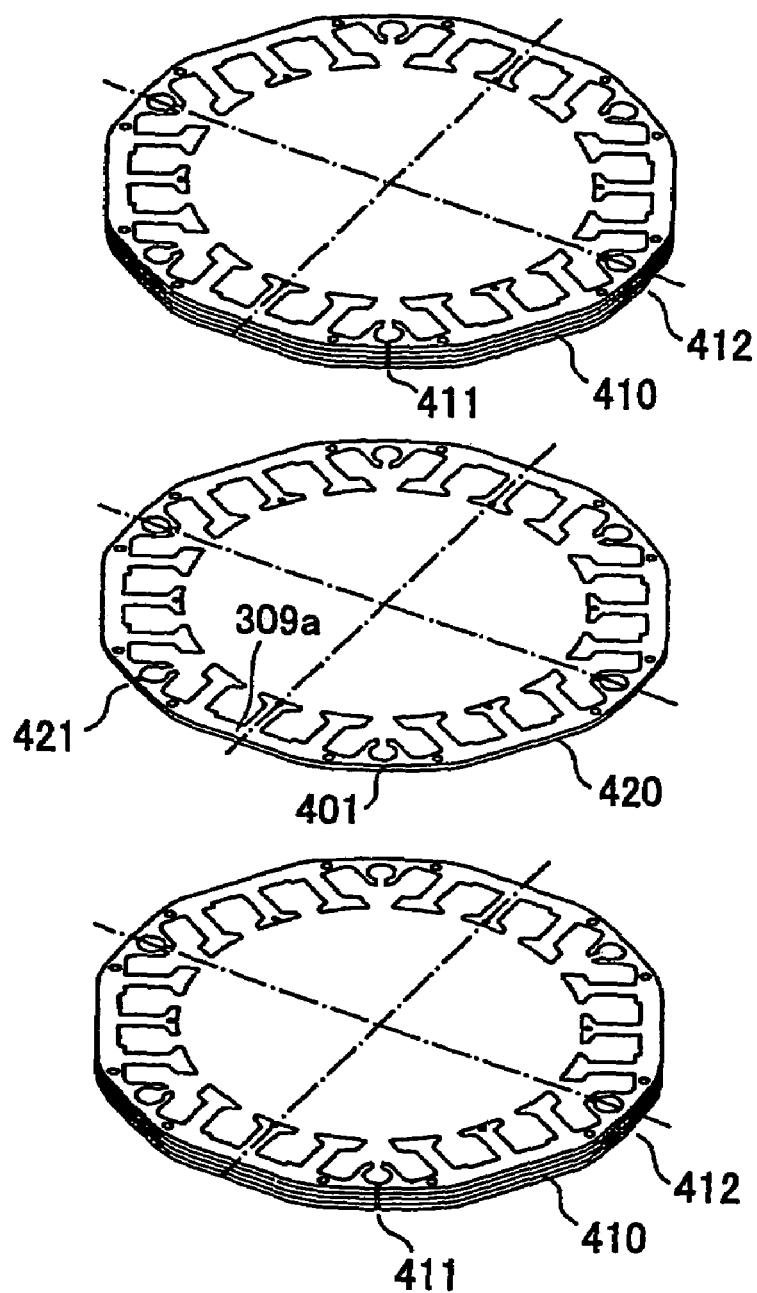
FIG. 18 is a perspective view showing the state in which the magnetic materials of the stacked stator core are stacked.

First of all, the stator core 300 for the rotary motor 80 will be described with reference to FIGS. 15 to 18. FIG. 15 is a perspective view of the stacked stator core for the stator core 300 of the rotary motor 80. FIG. 16 is a perspective view of the partially exploded stacked stator core. FIG. 17 is a schematic view of stator cores with extremely elongated between the stator core at connection parts. FIG. 18 is a perspective view showing the state how the sheet magnetic materials of the stacked stator core are stacked.

Referring to FIG. 15, reference numeral 50 denotes a stacked stator core formed by stacking a plurality of stator cores 300 in a ring and each stator core 300 is successively connected through stator core connecting portions (interconnection portions) 401. Further, as shown in FIG. 16, the stator cores 300 can be successively unfolded straight by bending the bent portions 304. As shown in FIGS. 16 and 17, a stator core made up of portion 401 consists of a bent portion 304 provided between a stepped yoke member 309 and the stator core 300 adjacent to the stepped yoke member 309, in the state of stacked stator core 50. As shown in FIG. 18, such stacked stator core 50 can be manufactured by mutually overlapping the same magnetic materials where a first divided portion 411 thereof is provided at the same place, i.e., stacked core 412 made up of four magnetic material cores 410 stacked such that the first divided portions 411 thereof are placed at the same position and a magnetic material core 420 having the same shape as that of magnetic material core 410 and a second divided portion 421 at the position shifted by 60°. The angle of 60° is calculated based on the fact that since in the second embodiment, six yoke members (five yoke members 301 and one stepped yoke member) in total have been provided, the angle made with one yoke member is 60° (360°÷6=60°). Here, in the above description, the case is shown in which the shift is done in an amount of one yoke member 301. Alternatively, if a stacked stator core 50 is formed by shifting the magnetic material core in the amount of a plurality of yoke members, for instance, two yoke members 301 (that is, by 120° in the second embodiment), the same effect may also be obtained.

In FIG. 18, the core connecting portion 401 corresponds to the bent portion 304 in the magnetic material core 420. When the part 309a adjacent to the second divided portion 421 in the magnetic material core 420 is stacked, stepped yoke member 309 is formed. When cut at the stator core connecting portion 401, each magnetic material core 410 and 420 is connected with caulkings 306 and 307 as shown in FIG. 13.

Figure 19:
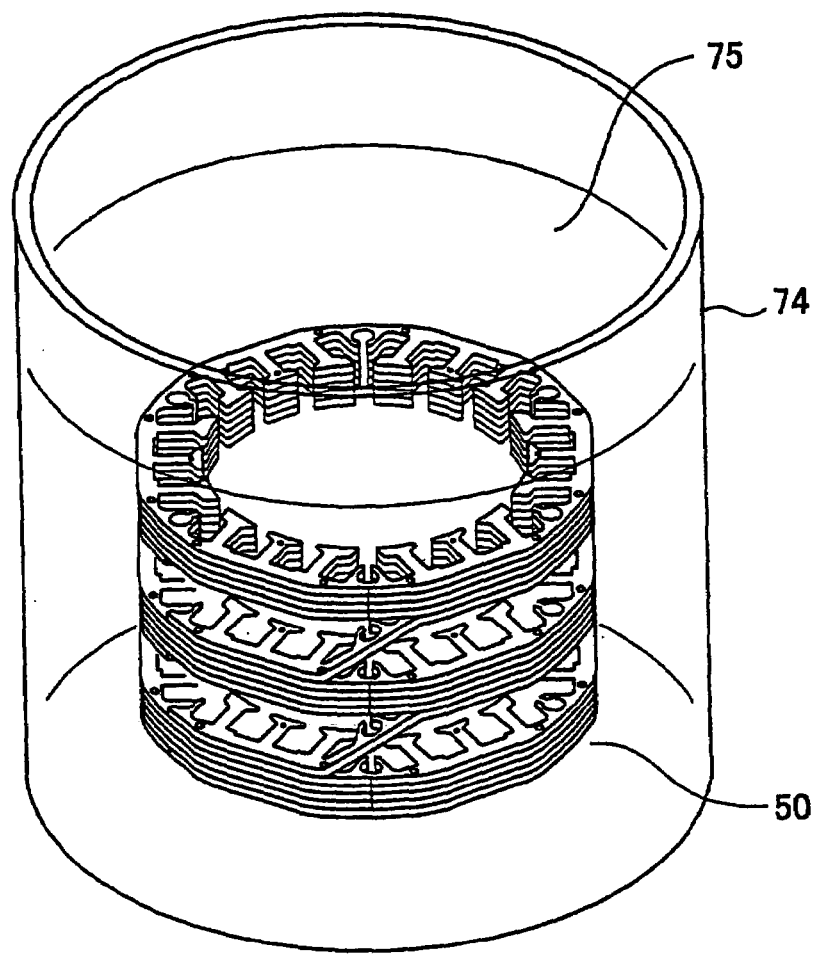
FIG. 19 is a schematic view showing the application of insulation coating to the stacked stator core.
Figure 20:
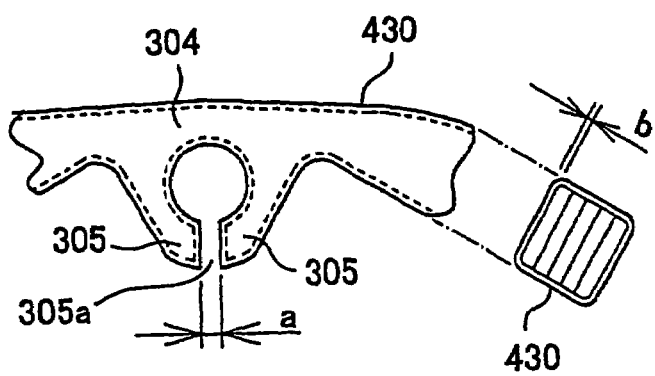
FIG. 20 is a partially enlarged view of the stacked stator core.

Application of insulation coating to the stacked stator core 50 will next be described with reference to FIGS. 19 and 20. FIG. 19 is a schematic view showing the application of insulation coating to the stacked stator core 50. FIG. 20 is a partially enlarged view of the stacked stator core 50.

Referring to FIG. 19, reference numeral 74 denotes an electrocoating bath, and coating liquid 75 is being filled therein. An elongated stacked stator core 50 is dipped in the coating liquid 75. Application of a voltage between an electrode (not shown) placed in the coating liquid 75 and the stacked stator core 50 forms insulation coating film 430 over the stacked stator core 50. In order to enable the stacked stator core 50 to unfold by the bending bent portion 304 as shown in FIG. 16, a gap in opening 305a between the ends of stator positioning protrusions 305 opposing each other before coating have been previously set such that the relationship of a>2b is kept with respect to the thickness b of the insulation coating film 430, not to close the opening 305a by the insulation coating. Insulation coating using cationic electrocoating, for instance, is popular as the insulation coating method.

Figure 21:
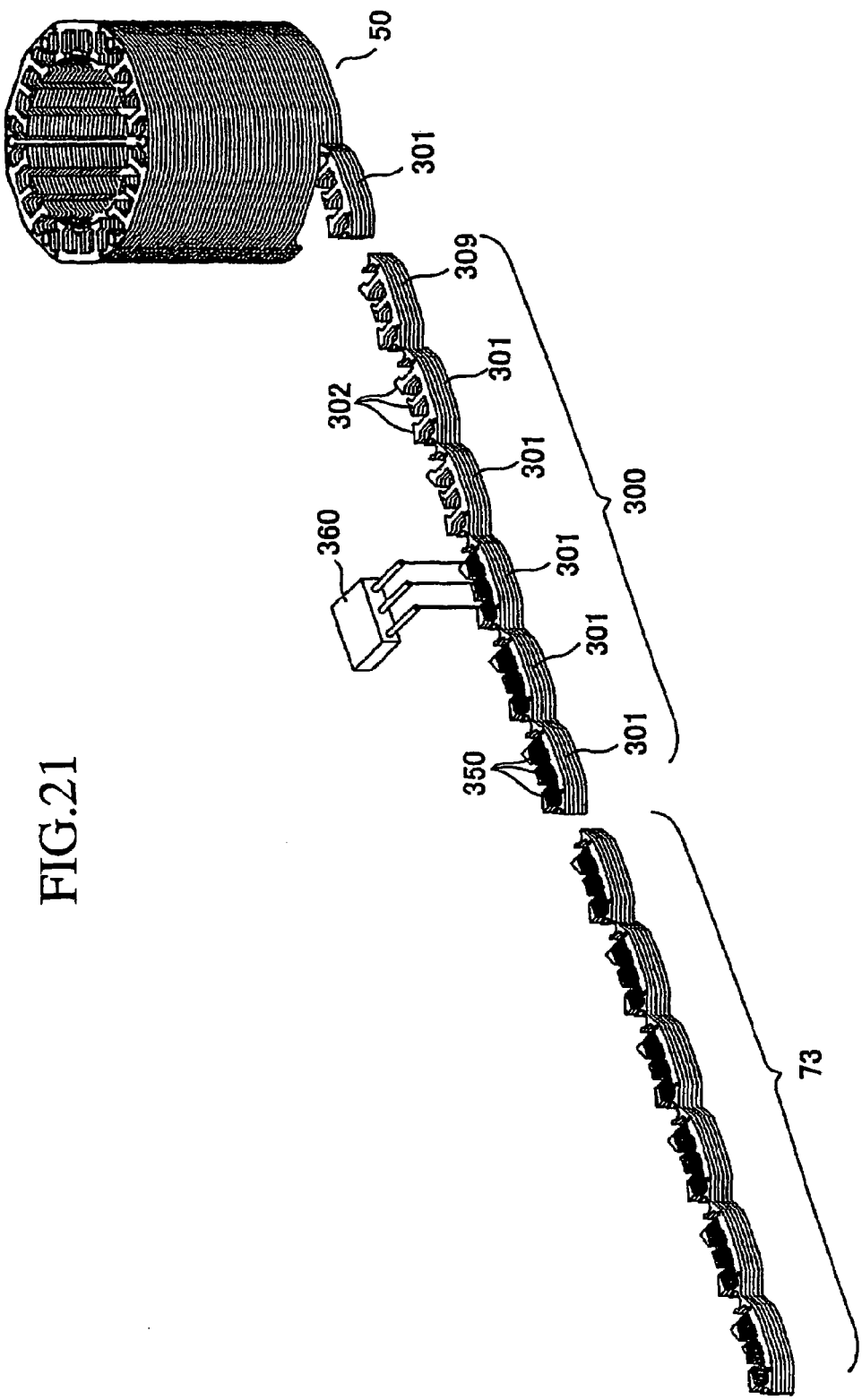
FIG. 21 is a perspective view showing the steps in which the stator cores are divided from the stacked stator core and the driving coils are wound around the stator core.
Figure 22:
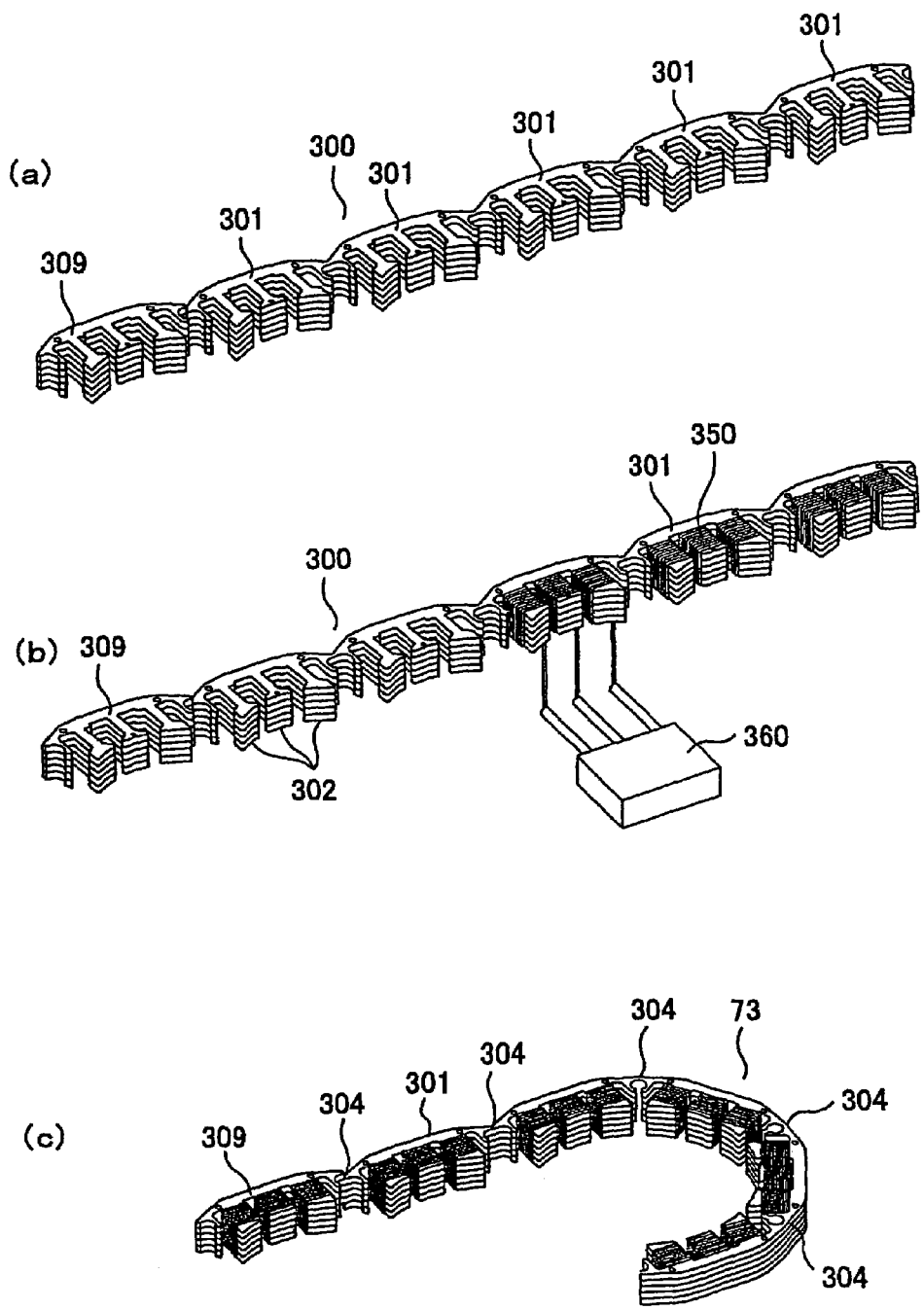
FIG. 22 is a perspective view showing the steps in which the driving coils are wound around the divided stator core and formed in a ring.

Wiring of the driving coils 350 wound around the stacked stator core 50 and mounting of the wire-wound stator 73 on the base 71 will be described with reference to FIG. 14, FIGS. 21 and 22. FIG. 21 is a perspective view showing the steps in which the stator cores 300 are divided from the stacked stator core 50 and the driving coils 350 are wound around the divided stator core 300. FIG. 22 is a perspective view showing the steps in which the driving coils 350 are wound around the divided stator core 300 and unfolded a stator 73 is formed in a ring. FIG. 14 is an exploded perspective view of the step in which the stator 73 is mounted on the base 71.

As shown in FIGS. 21 and 22, the stator cores 300 are unfolded from the stacked stator core 50 and divided at the stator core connecting portion 401 (FIG. 16). FIG. 22A is a view of a divided stator core 300. Then, the driving coils 350 are simultaneously wound around the magnetic pole teeth 302 of the yoke members 301 by a winding machine 360 (FIG. 22B). The wire-wound stator 73 is bent at the bent portions 304 and arranged in a ring (FIG. 22C). As shown in FIG. 14, the ring-shaped stator 73 is mounted on the base 71. A rotary motor 80 is finished by soldering coil terminals 351 and a common coil terminal 352 with coil terminal lands 103 and a coil terminal land 104, respectively.

Adoption of such a method of manufacturing stators used for rotary motors improves both the workability in the winding process, and the mass productivity of the stators and rotary motors.

Figure 23:
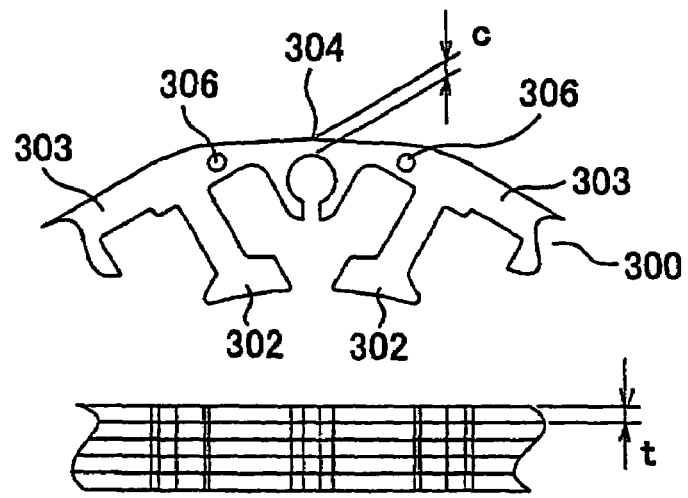
FIG. 23 is a partially enlarged view in the vicinity of the bent portion of the stator core and a sectional view thereof.
Figure 24:
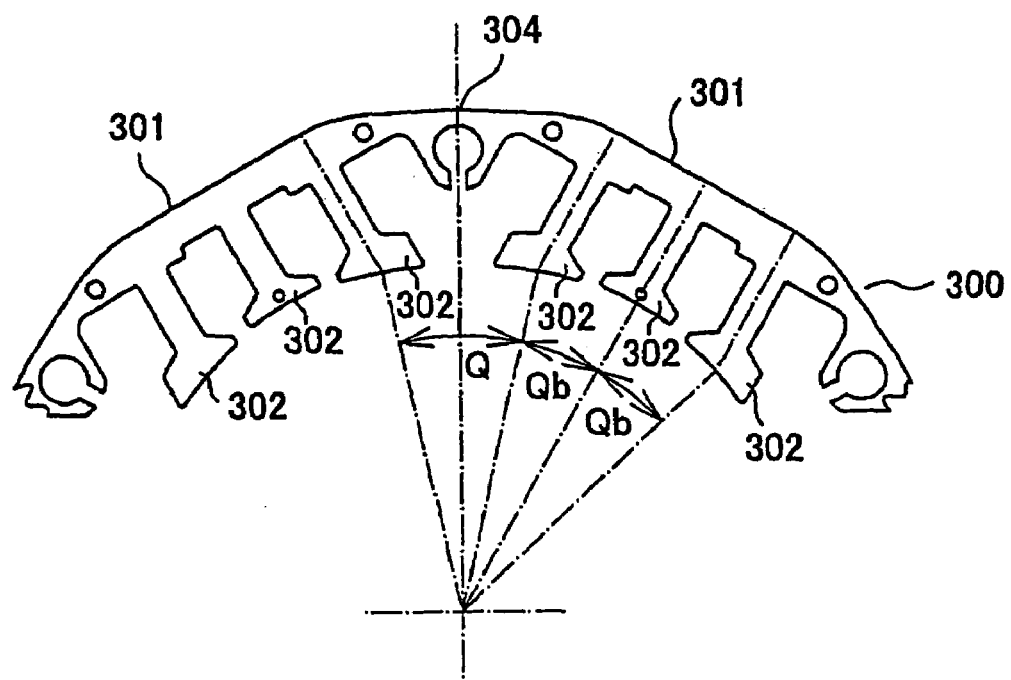
FIG. 24 is a plan view showing the angle pitches of the magnetic pole teeth.

The shape of the stator core 300 of the above rotary motor 80 will be described with reference to FIGS. 23 and 24. FIG. 23 is a partially enlarged view and a corresponding sectional view in the vicinity of the bent portion 304 of the stator core 300. FIG. 24 is a plan view showing the angle pitches of the magnetic pole teeth 302. The width c of bent portion 304 in the diameter direction is set such that the width c satisfies the relationship of $1.5\ t \leq c \leq 2.5\ t$ for the thickness t of one stacked sheet magnetic material. The reason why this relationship is established is to prevent the bent portion 304 from being divided when the stator core 300 is unfolded straight by bending the bent portion 304 to wind the driving coil 350, and subsequently the stator 73 is arranged in a ring by again bending the bent portion 304 of the stator core 300. An experimental investigation of the relationship between the width c and the thickness t of the bent portion 304 in terms of the bending times of the bent portion 304 revealed that the the bent portion 304 can endure several times of bending if the width c of the bent portion 304 is 1.5 t or more. However, it turned out that inasmuch as the width c of bent portion 304 is set up too large, the bending at the prescribed position of the bent portion 304 is sometimes failed and so can not take the arrangement in a ring when one tries to make the stator 73 in a ring. It is experimentally proved that the suitable width c of bent portion 304 is 2.5 t or less.

Moreover, as shown in FIG. 24, it is possible to reduce the cogging torque by setting the electrical angle pitches θb between magnetic pole teeth 302 located within one yoke member 301 and the electrical angle pitch θ between the magnetic pole tooth 302 located within the one yoke member 301 and a magnetic pole tooth 302 within the yoke member 301 adjacent to the one yoke member 301 so as for the electrical angle pitches θb and θ to satisfy the relationship of θ≠θb. However, because the driving power of the rotary motor is lowered when the relationship between θb and θ is significantly altered each other, it is preferable that the suitable shift amount between both the electrical angle pitches is 10° or less in electric angle. That is, the electric angle θ satisfying the relationship of $θb-10°≦θ≦θb+10°$ and θ≠θb is advisable.

Figure 25:
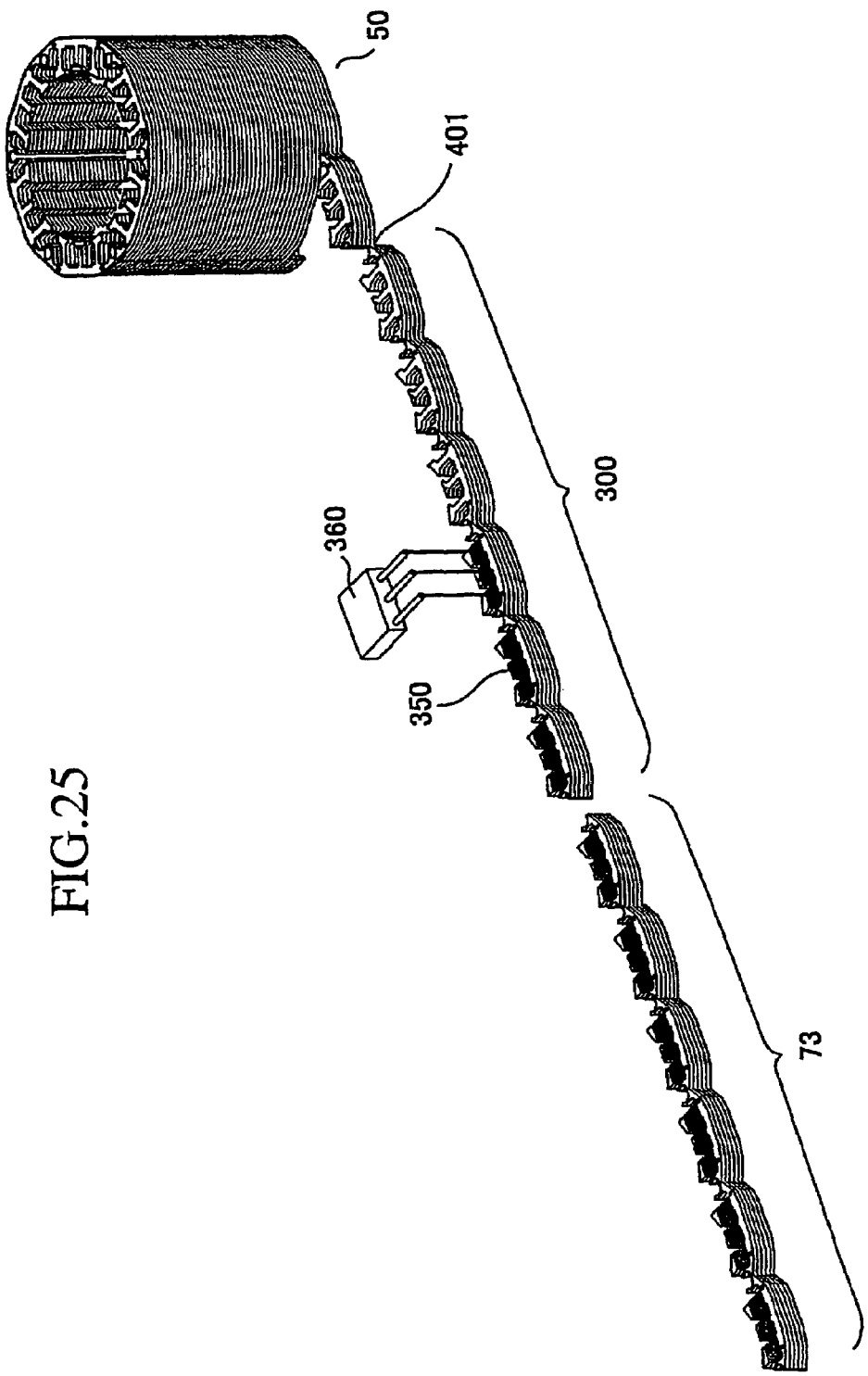
FIG. 25 is a view showing the method of manufacturing stators after the driving coils are wound.

In the second embodiment, the stator core 300 is divided from the stacked stator core 50 and the driving coils 350 are wound around the stator core 300. Naturally, as shown in FIG. 25, if the stator 73 is manufactured by dividing the stator core 300 from the stacked stator core 50 after the driving coils 350 are wound around the stator core 300, the same effect can be obtained. That is, it is needless to say that the workability in the winding process, and the productivity of the stators and rotary motors can be improved.

Third Embodiment

In above second embodiment, a stator 73 is mounted on a rotary motor 80 with a difference in level of one sheet magnetic material (magnetic material cores 410, 420) provided between the stepped yoke member 309 and the yoke members 301.

A method of reducing the influence of the difference in level between these yoke members caused by the stepped yoke member 309 will be described. Like or equivalent members as that of the second embodiment are given like reference numerals, and thus the description thereof is omitted for brevity's sake.

Figure 26:
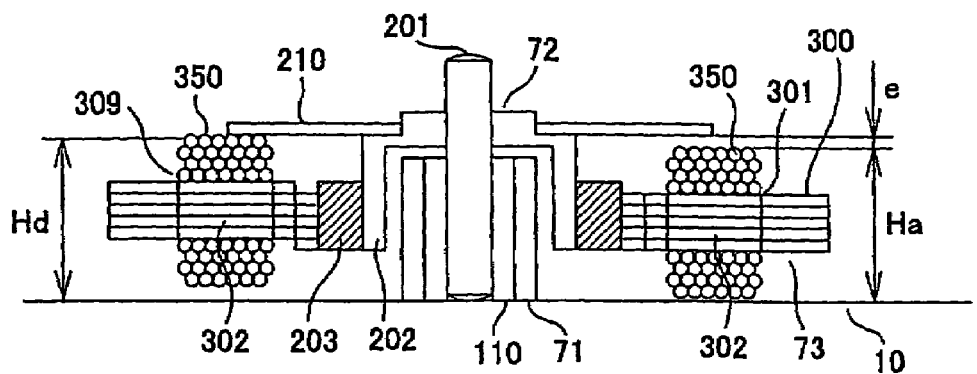
FIG. 26 is a view showing the state in which the rotor of the rotary motor is provided with the cover table according to a second embodiment.

FIG. 26 is a sectional view showing the state in which a cover table 210 is provided over the rotor 72 of the rotary motor 80 in the second embodiment to keep the invasion of dust or the like out of the cavity between the rotor magnet 203 and the stator 73. In FIG. 26, reference numeral 110 denotes a bearing that engages with a shaft 201 installed in the base 71. In this case, a difference in level is provided between the height Ha of yoke member 301 and the height Hd of stepped yoke member 309. When the cover table 210 is provided over the upper surface of the driving coil 350 wound around the magnetic pole teeth 302 of the yoke member 301 through a prescribed space e, the cover table 210 comes into contact with the driving coil 350 wound around the magnetic pole teeth 302 of the stepped yoke member 309. As a result, the prescribed operation of the rotary motor 80 is not accomplished, or the rotary motor 80 does not rotate. One of the solutions to this problem is to increase the space e. However, such a solution gives rise to difficulties in thinning the rotary motor 80 because the thickness of the motor itself increases.

In the third embodiment, a method of removing the influence of the stepped yoke member 309 while avoiding the trouble of increasing thickness of rotary motor 80.

Figure 27:
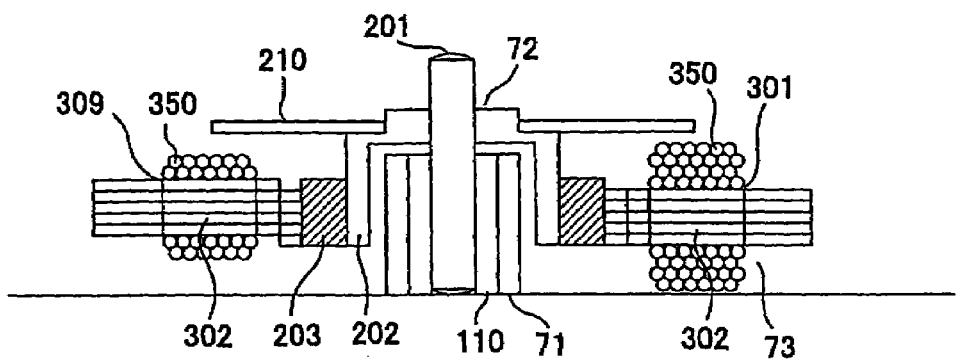
FIG. 27 is a view showing the sectional structure in which the number of coil winding of the driving coil wound around the magnetic pole teeth of the stepped yoke member is smaller than that of the yoke member.

One of effective methods is to reduce the number of winding of the driving coil 350 wound around the magnetic pole teeth 302 of the stepped yoke member 309 compared with the number of winding of the driving coil 350 wound around the magnetic pole teeth 302 of the yoke member 301 as shown in FIG. 27.

Figure 28:
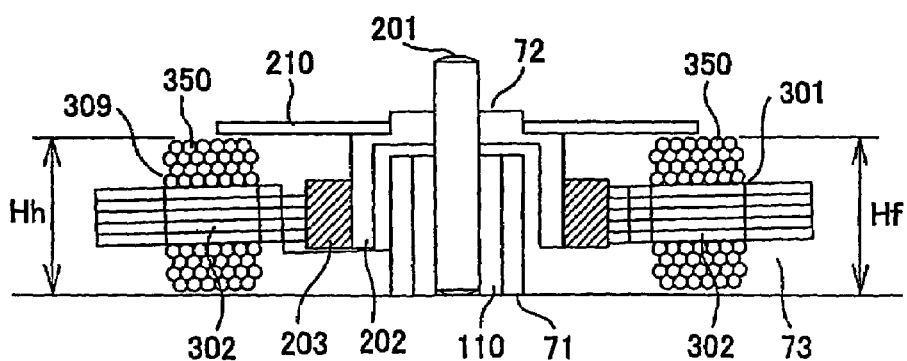
FIG. 28 is a view showing the sectional structure in which the stator is mounted on the base with a gradient such that the step yoke member side is lower than the level shown in FIG. 26 and the height Hh of the top surface of the driving coil wound around the magnetic pole teeth of the step yoke member is the same as the height Hf of the top surface of the driving coil wound around the magnetic pole teeth of the yoke member.

Another method is to mount the stator 73 onto the base 71 with a gradient as shown in FIG. 28 such that the height of the driving coil of the stepped yoke member 309 is lower than the height thereof shown in FIG. 26. Then, the stator 73 is arranged such that the height Hf of the uppermost part of the driving coil 350 wound around the magnetic pole teeth 302 of yoke member 301 is identical with the height Hh of the uppermost part of driving coil 350 wound around the magnetic pole teeth 302 of the stepped yoke member 309.

Figure 29:
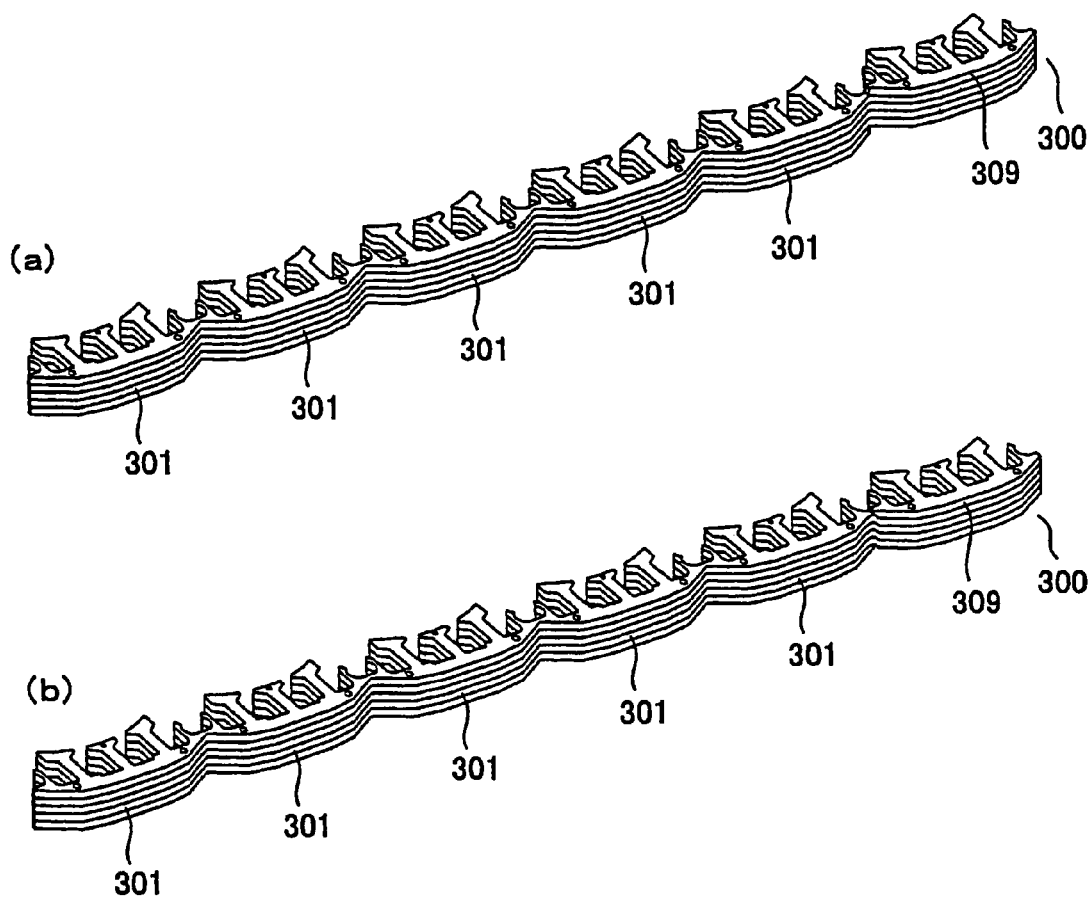
FIG. 29 is a view showing the method of eliminating the difference in level of the step yoke member by press-forming the step yoke member.
Figure 30:
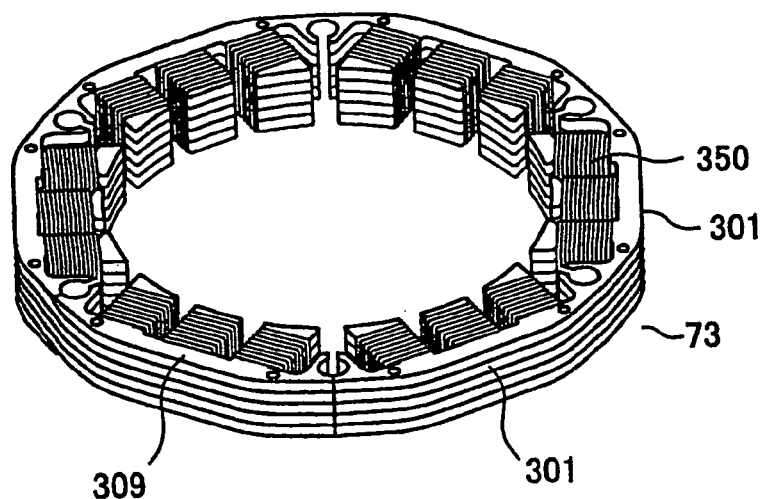
FIG. 30 is a view showing the method of eliminating the difference in level of the step yoke member by press-forming the step yoke member.
Figure 31:
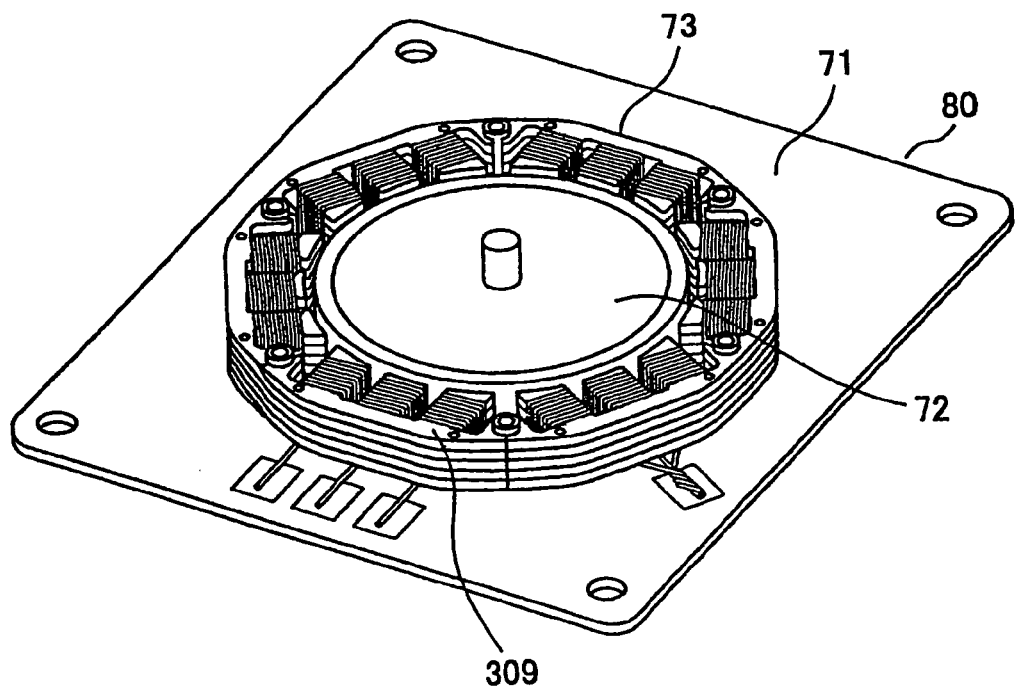
FIG. 31 is a view showing the method of eliminating the difference in level of the step yoke member by press-forming the step yoke member.

In addition, still another method is to press forming the stator core 300 having the stepped yoke member 309 (FIG. 29A) as shown in FIG. 29 such that the height of the stepped yoke member 309 becomes flush with that of the other yoke members 301 (FIG. 29B) to eliminate the difference in level of the stepped yoke member 309. After that, the driving coils 350 are formed by winding a wire around each of magnetic pole teeth 302 and a stator 73 is formed by bending each yoke member 301 in a ring as shown in FIG. 30. Subsequently, the stator 73 are mounted and fixed onto the base 71 as shown in FIG. 31. This method of making the height of the stepped yoke member 309 flush with that of the yoke member 301 is extremely effective.

As mentioned above, thin rotary motors 80 can be easily implemented when the influence of the stepped yoke member 309 is removed by the above methods of changing the number of winding of the driving coil 350, mounting the stator 73 to the base 71 by inclining the stator 73, and press forming the stepped yoke member 309.

Fourth Embodiment

Figure 32:
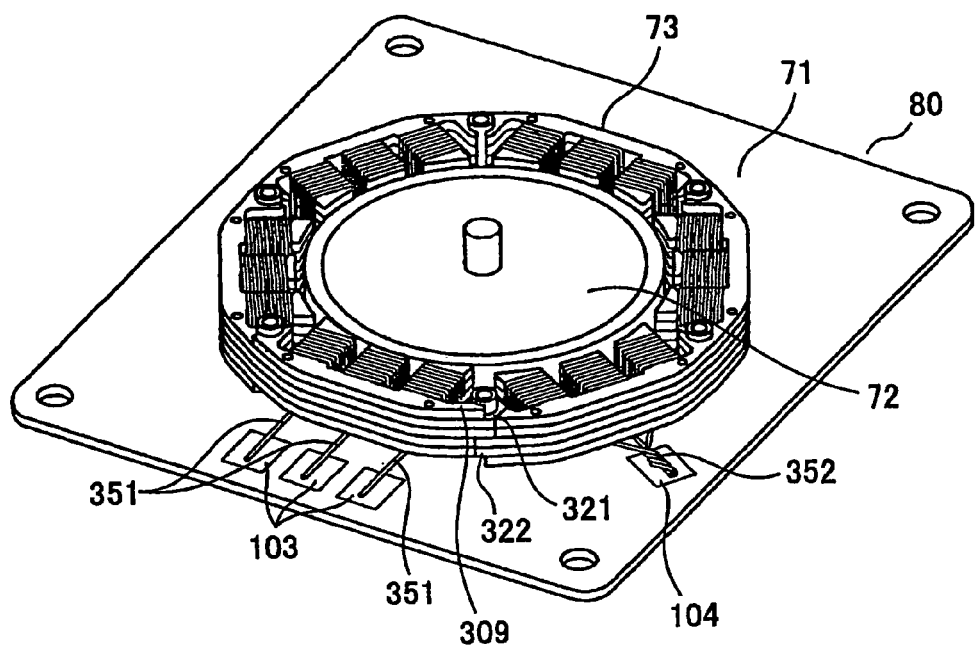
FIG. 32 is a perspective view of the rotary motor.
Figure 33:
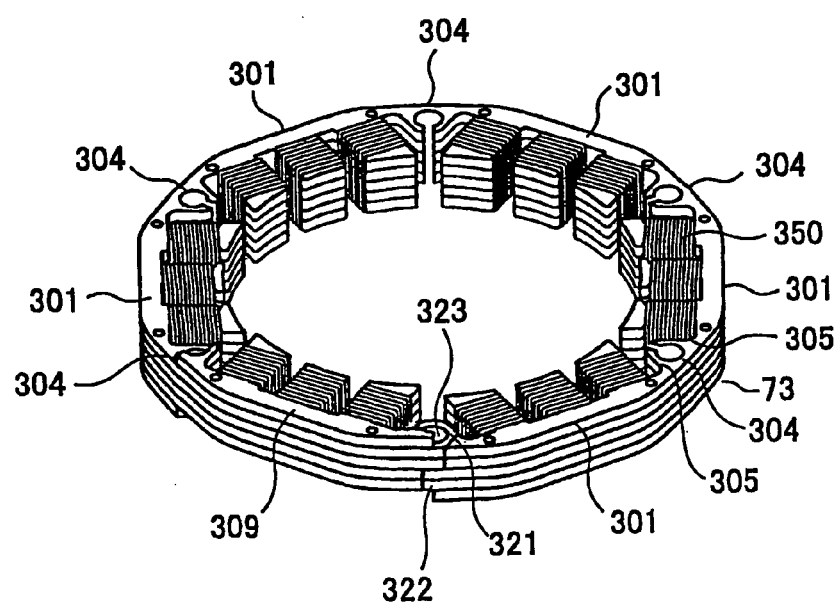
FIG. 33 is a perspective view of the stator for the rotary motor.
Figure 34:
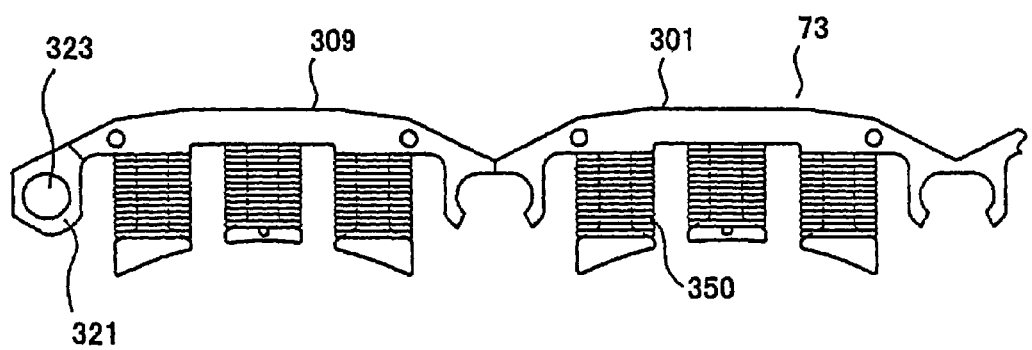
FIG. 34 is a partially enlarged view of the unfolded stator.
Figure 35:
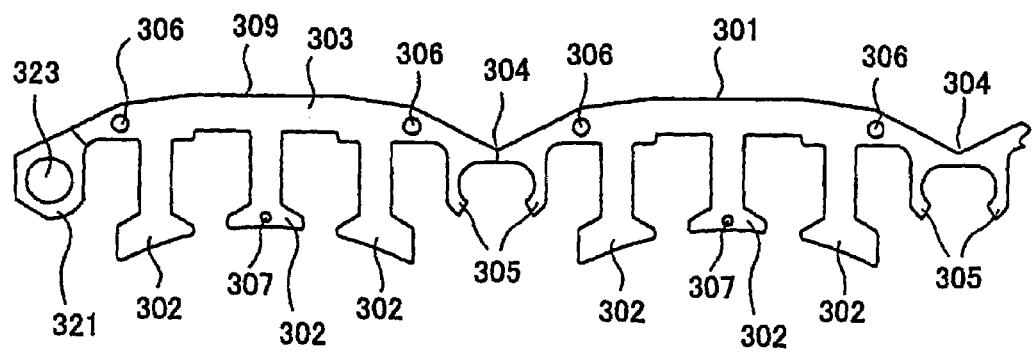
FIG. 35 is a partially enlarged view of the unfolded stator core.
Figure 36:
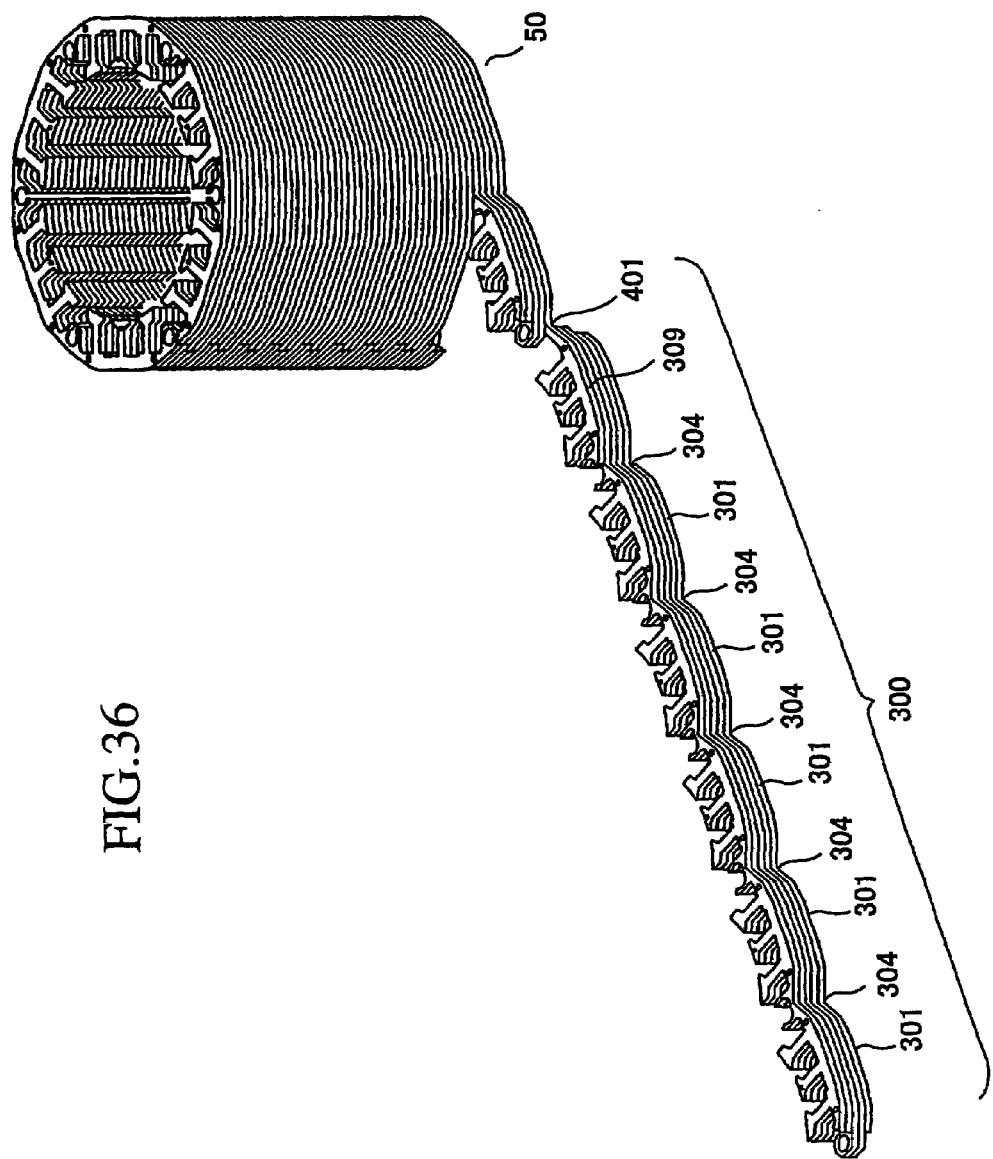
FIG. 36 is a perspective view showing the state in which the stacked stator core is partially unfolded.
Figure 37:
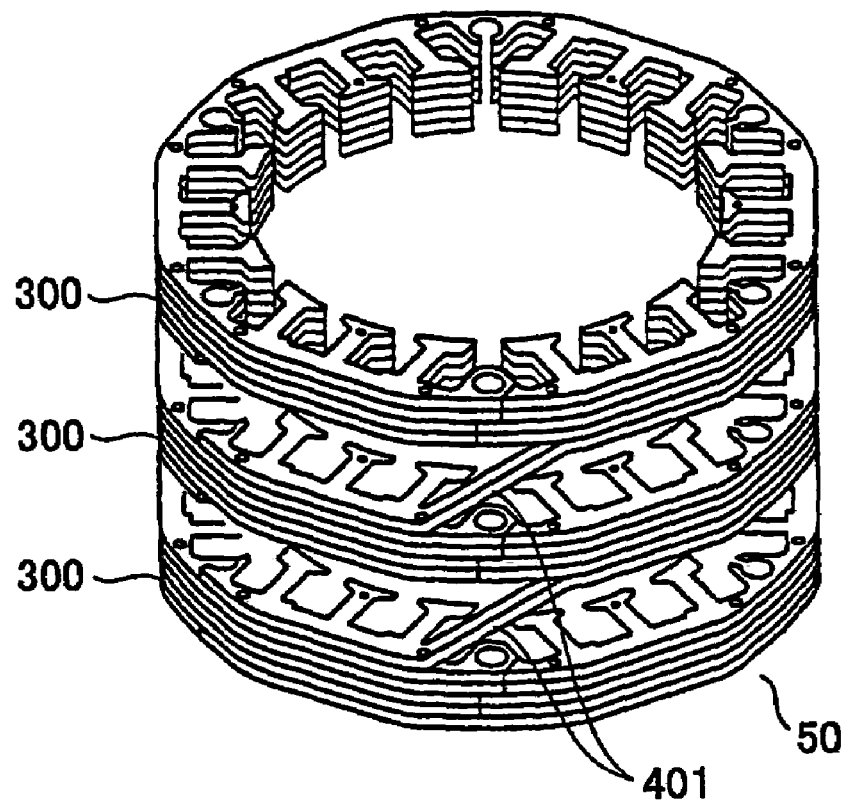
FIG. 37 is a schematic view of the elongated stacked stator core.
Figure 38:
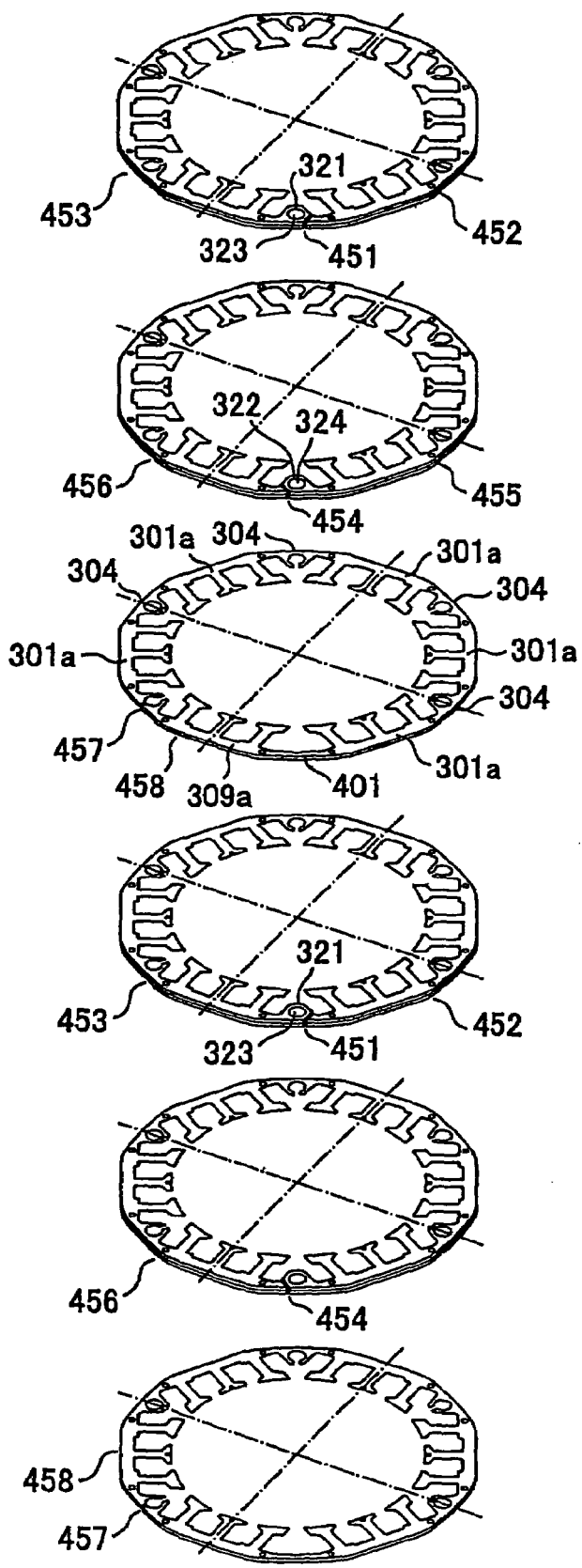
FIG. 38 is a perspective view showing how the magnetic materials of the stacked stator core are stacked.
Figure 39:
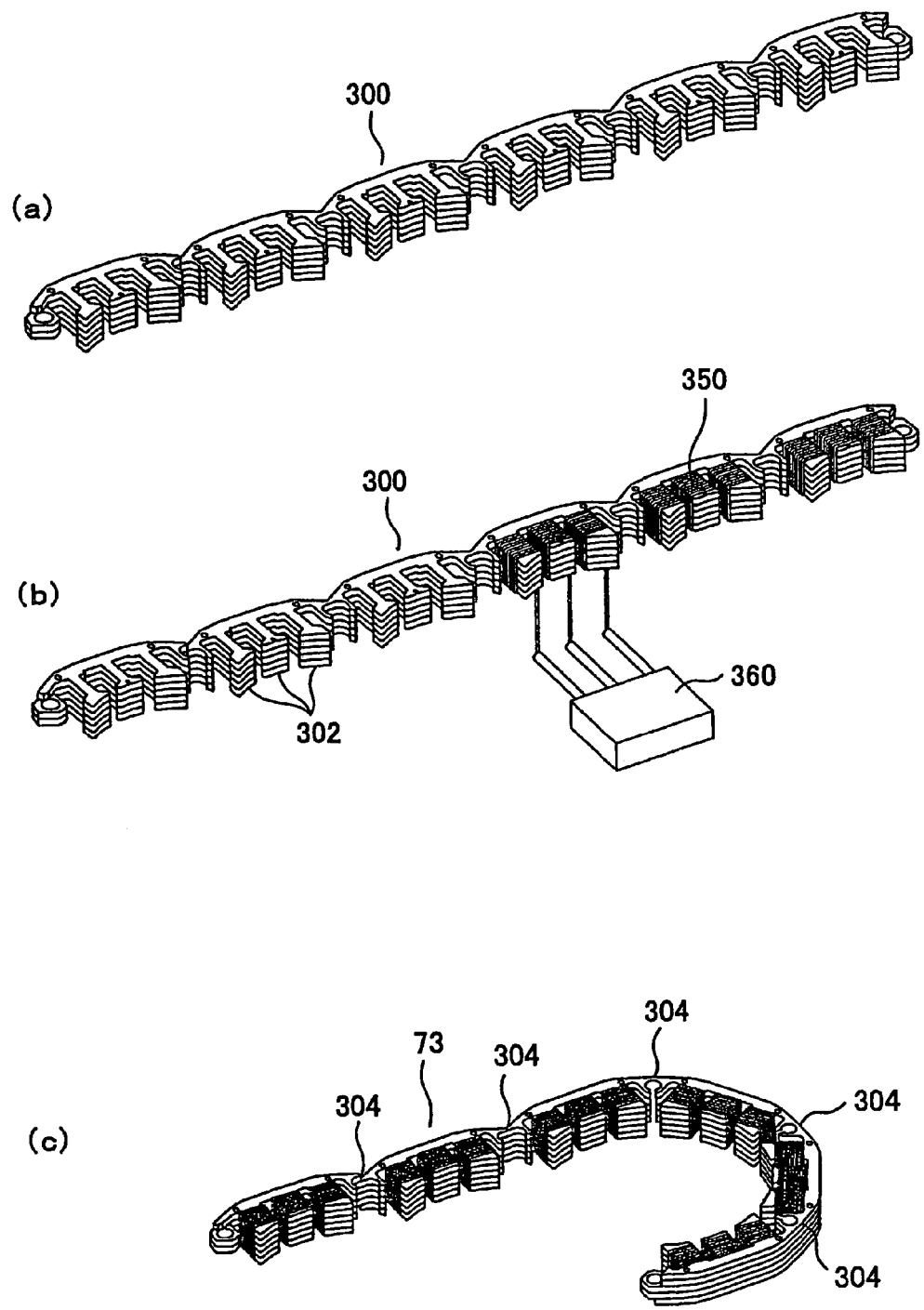
FIG. 39 is a perspective view showing the steps in which the driving coils are wound around the stator core divided from the stacked stator core and the stator sore is formed in a ring.
Figure 40:
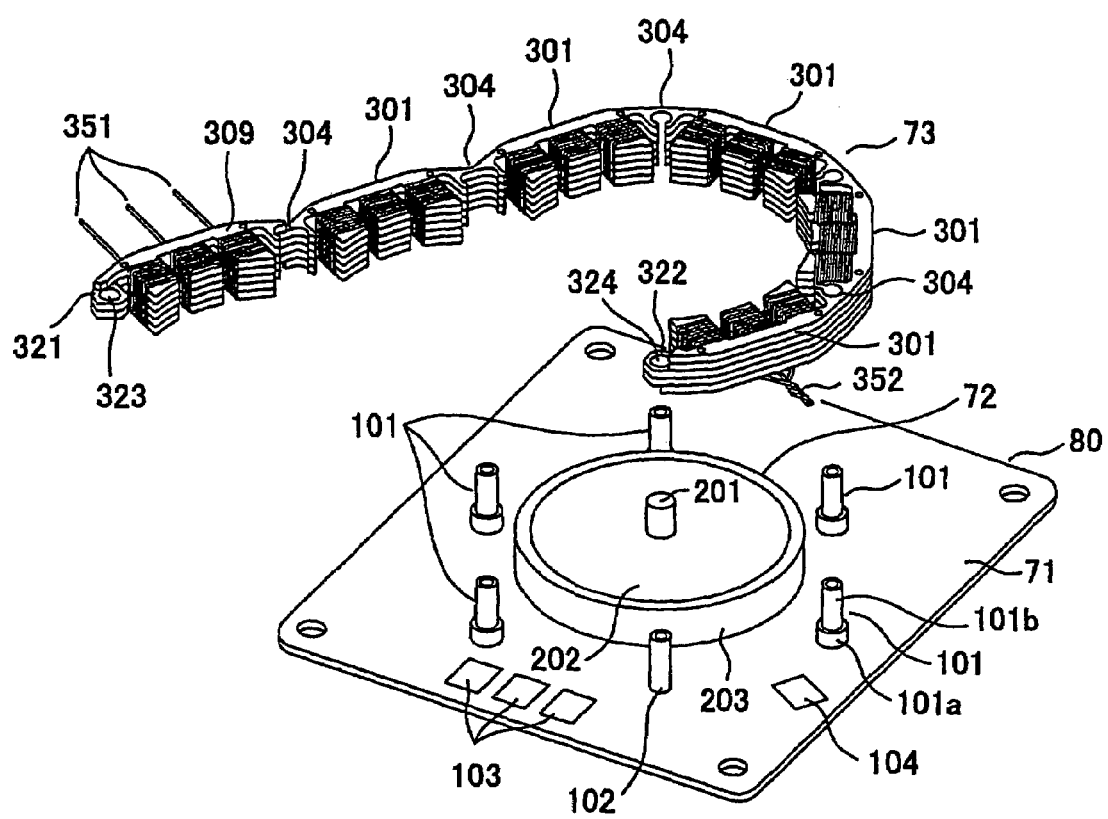
FIG. 40 is a perspective view showing the step in which the stator is mounted on the base.

As a structure in which yoke members are overlapped one another in the stator core, the stacked stator and rotary motor of the fourth embodiment 4 which increases mounting of the stator 73 on the base 71 will next be described with reference to FIGS. 32 to 40. FIG. 32 is a perspective view of the rotary motor. FIG. 33 is a perspective view of the stator for the rotary motor. FIG. 34 is a partially enlarged view of the unfolded stator. FIG. 35 is a partially enlarged view showing the state in which the stator core is unfolded. FIG. 36 is a perspective view showing the state in which the stacked stator core is partially unfolded. FIG. 37 is a schematic view showing the state in which the stacked stator core is elongated. FIG. 38 is a perspective view showing the state in which the sheet magnetic materials of the stacked stator core are stacked. FIG. 39 is a perspective view showing the steps in which the stator core 300 is divided from the stacked stator core 50, the driving coils 350 are wound around the stacked stator core 50, and subsequently arranged in a ring. FIG. 40 is a perspective view showing the step in which the stator 73 is mounted on the base 71. Like or equivalent members as that of the second embodiment are given like reference numerals and thus the description thereof is omitted for brevity's sake.

As shown in FIG. 40, the base 71 is provided with stator fastening pins 101 having a support flange 101a and an engaging portion 101b for positioning and fastening the stator 73, a stator supporting pin 102 for positioning the stator 73, and a rotor 72 pivotally connected thereto.

As shown in FIGS. 32 to 34, and FIG. 40, a stator 73 is made up of a stator core 300 formed by stacking sheet magnetic materials, and driving coils 350.

The stator core 300 is provided with yoke members 301 made up of magnetic pole teeth 302 that is provided in proportion to the number of driving phase and yokes 303 having tooth-shaped magnetic pole teeth 302, bent portions 304 for connecting the yoke members 301, stator positioning protrusions 305 arranged opposed to each other on both sides of the bent portion 304 in the same direction as that of the magnetic pole teeth 302, core connecting portions 321, 322 having punched thereon connecting and fixing holes 323, 324, provided at the ends of the stator core 300 such that the core connecting portions 321, 322 are overlapped one another when the stator core 300 is arranged in a ring, and a stepped yoke member 309 is provided with the magnetic pole teeth 302 and yokes 303 as in other yoke members 301 and having partially a sheet magnetic material not connected with other yoke members 301, with each of the driving coils are being wound around the magnetic pole teeth 302.

Stator positioning protrusions 305 are provided so that holes engaging with stator fastening pin 101 are formed in the state in which the stator 73 is arranged in a ring. Moreover, as shown in FIG. 32, FIGS. 33 and 40, the core connecting portions 321 and 322 are also provided such that the core connecting portions 321, 322 located at both ends are overlapped one another and the connecting and fixing holes 323 and 324 engage with the stator supporting pin 102 when the stator 73 is arranged in a ring.

The stepped yoke member 309 and other yoke members 301 have the same number (five) of stacked sheet magnetic materials, and therefore a difference in level of a sheet magnetic material is provided because the stepped yoke member 309 is shifted by a sheet magnetic material from other yoke members 301 toward the upper surface relative to the stacking direction.

The rotary motor 80 so arranged as above can rotate rotor 72 by feeding a prescribed amount of current through each driving coil 350. Moreover, the provision of stepped yoke member 309 makes difference in the forces of attraction acting on the rotor 72 between yoke members 301 and stepped yoke members 309 in the direction of the rotation axis 201 of rotor 72. As a result, the moment of a force of the direction in which the rotation axis 201 inclines toward the stator 73 is exerted on rotor 72, and it becomes possible to stabilize the rotation of rotor 72 even when an oscillation or the like is applied to the rotary motor 80.

Moreover, the core connecting portions 321,322 having connecting and fixing holes 323, 324 are provided at both ends of the stator core 300 so that the stator supporting pin 102 engages with the connecting and fixing hole 323, 324. Therefore, the workability and positioning are improved when the stator 73 is arranged in a ring and fixed on the base 71, and it becomes possible to firmly fix the stator 73 on the base 71.

The method of manufacturing such rotary motor 80 will now be described.

First of all, a stator core 300 used for the rotary motor 80 will be described with reference to FIGS. 36 to 38. Referring to the FIGS. 36 to 38, reference numeral 50 denotes a stacked stator core formed in such a manner that a plurality of stator cores 300 having a ring are stacked and each the stator core 300 is successively connected through stator core connecting portions 401. As shown in FIG. 36, stator cores 300 can be unfolded straight by bending bent portions 304.

As shown in FIG. 38, such stacked stator core 50 is manufactured by successively overlapping the following parts: a stacked core A453 formed by overlapping two magnetic material cores 452 having a first divided portion 451 provided in the vicinity of the part corresponding to the core connecting portion 321, which are the same to each other and are overlapped such that the first divided portions 451 thereof are placed at the same position; a stacked core B456 formed by overlapping two magnetic material cores 455 that are in mirror image relation to the magnetic material core 452, i.e., correspond to the material core 452 turned reversely at an angle of 180 degree, have a second divided portion 454 provided in the vicinity of the part corresponding to the core connecting portion 322, and overlapped one another; and a magnetic material core 458 having a partially notched stator core connecting portion 401 provided for omitting connecting and fixing holes 323, 324 at the part corresponding to the position of bent portion 304 and a third divided portion 457 provided at bent portion 304 located in the position away from the stator core connecting portion 401 by a distance of one yoke member. In FIG. 18, reference numeral 301a denotes the part to be yoke member 301 when stacked, and the numeral 309a denotes the part to be stepped yoke member 309 when stacked, respectively.

The stacked core A 453, the stacked core B 456, and the magnetic material core 458 are connected to each other by caulkings 306, 307 as shown in FIG. 35 when cut at stator core connecting part 401. Winding of the driving coils 350 wound around the stacked stator core 50 and mounting of the stator 73 on the base 71 are carried out in the same manner as the second embodiment as shown in FIG. 36, FIGS. 39 and 40. As shown in FIG. 36, stator cores 300 are unfolded from the stacked stator core 50 and divided at the stator core connecting portion 401. Then, the driving coils 350 are consecutively wound around the magnetic pole teeth 302 of the yoke members 301 by a winding machine 360. The wire-wound stator 73 is bent at the bent portions 304 and arranged in a ring. As shown in FIG. 40, the ring-shaped stator 73 is mounted on the base 71. A rotary motor 80 is finished by soldering coil terminals 351 and a common coil terminal 352 with coil terminal lands 103 and 104, respectively. The adoption of the above method of manufacturing rotary motors improves workability in the winding process and the productivity of rotary motors. In addition to the above effects, when the stators 73 are arranged in a ring and fixed on the base 71, the workability and positioning are improved, and it becomes possible to firmly fix the stators 73 on the bases 71.

Fifth Embodiment

In the above second and fourth embodiments, in order to manufacture a stacked stator core 50, sheet magnetic materials are stacked for forming the yoke members 301 (including the stepped yoke member 309) located on both sides of the stator core connecting portion 401 connecting the stator cores 300, and joined by caulking 306, 307. For this reason, a stepped yoke member 309 is formed after the stator cores are divided at the stator core connecting portion 401. The fifth embodiment provides connecting means for connecting stator cores 300 in which no difference in level is provided between the magnetic pole teeth 302 around which the driving coils 350 are wound.

The fifth embodiment will be described with reference to FIGS. 41 to 43.

Figure 41:
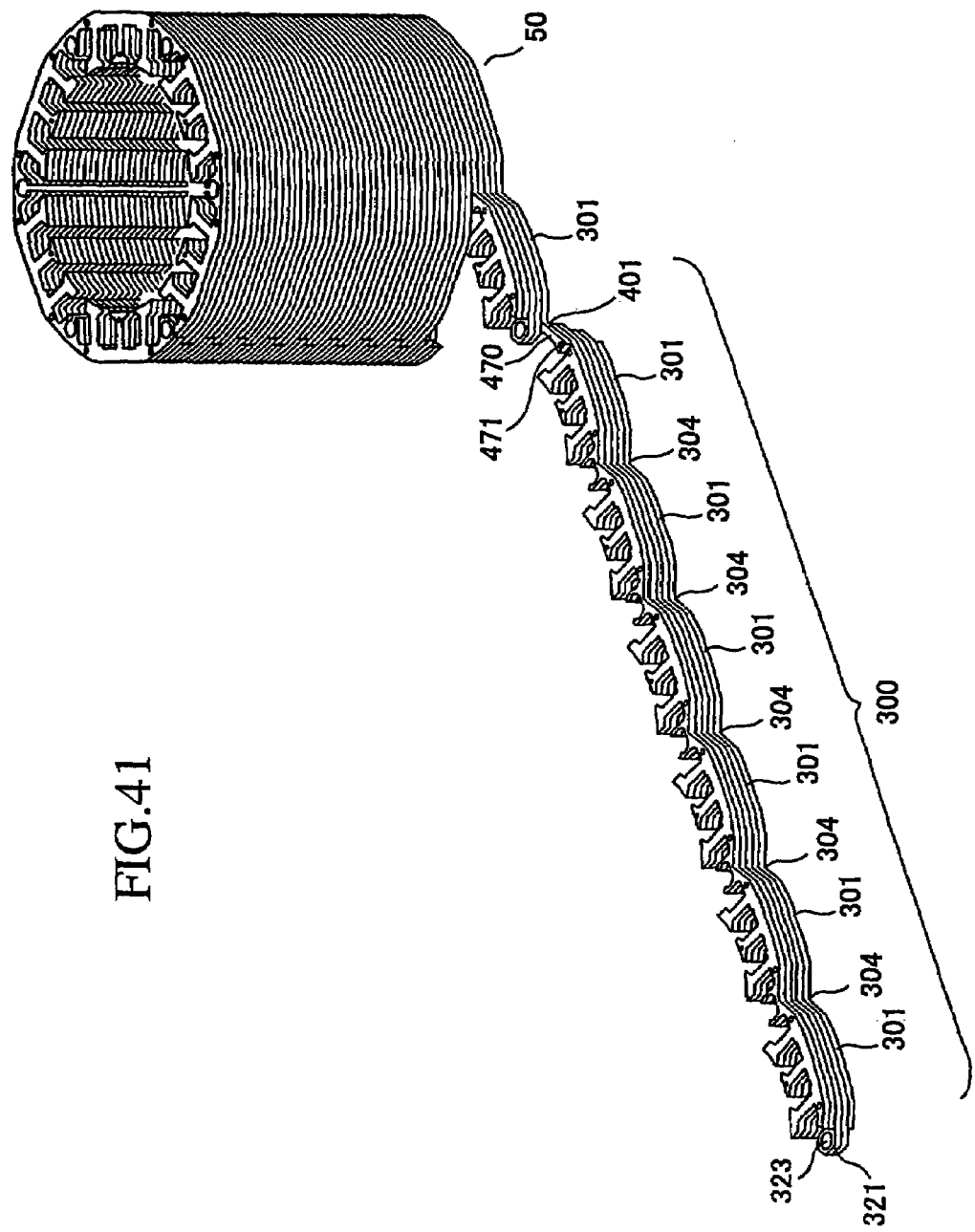
FIG. 41 is a perspective view showing the state in which the stacked stator core is partially unfolded.

FIG. 41 is a perspective view showing the state in which the stacked stator core 50 is partially unfolded. FIG. 42 is a schematic view showing the state in which the stator core is elongated. FIG. 43 is a perspective view showing the steps in which the stator core 300 is divided from the stacked stator core 50 and the driving coils 350 are wound around the stator core 300. Like or equivalent members as that of the second and fourth embodiments are given like reference numerals and thus the description thereof is omitted for brevity's sake.

Figure 42:
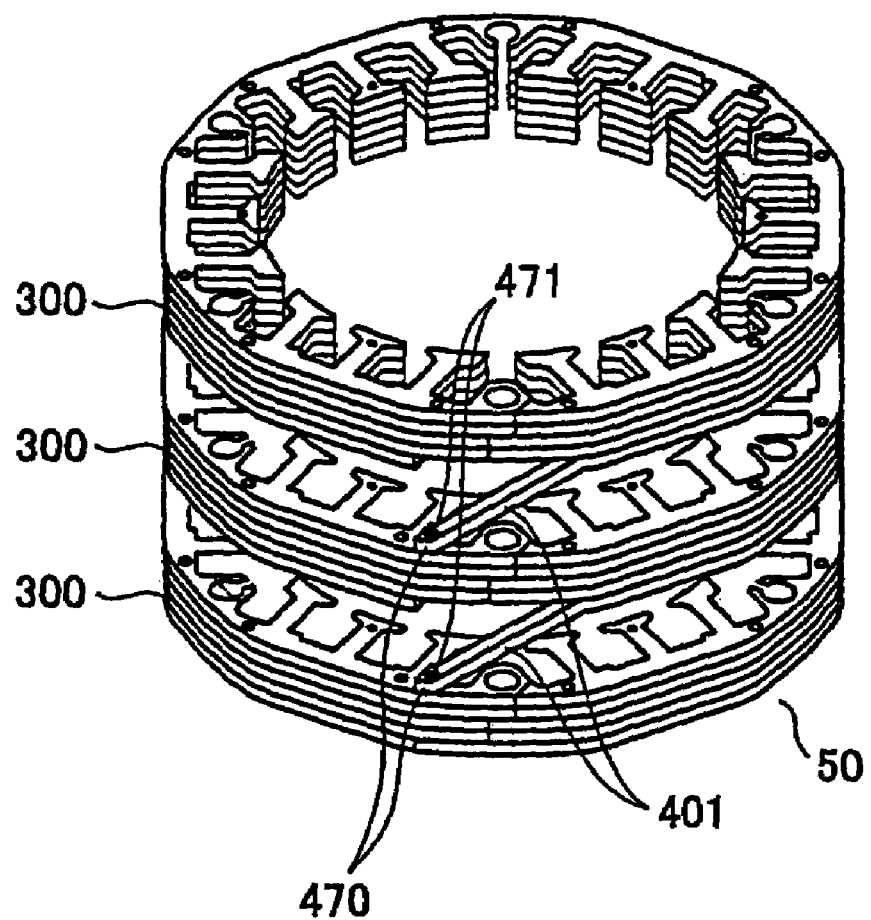
FIG. 42 is a schematic view of the elongated stacked stator core.
Figure 43:
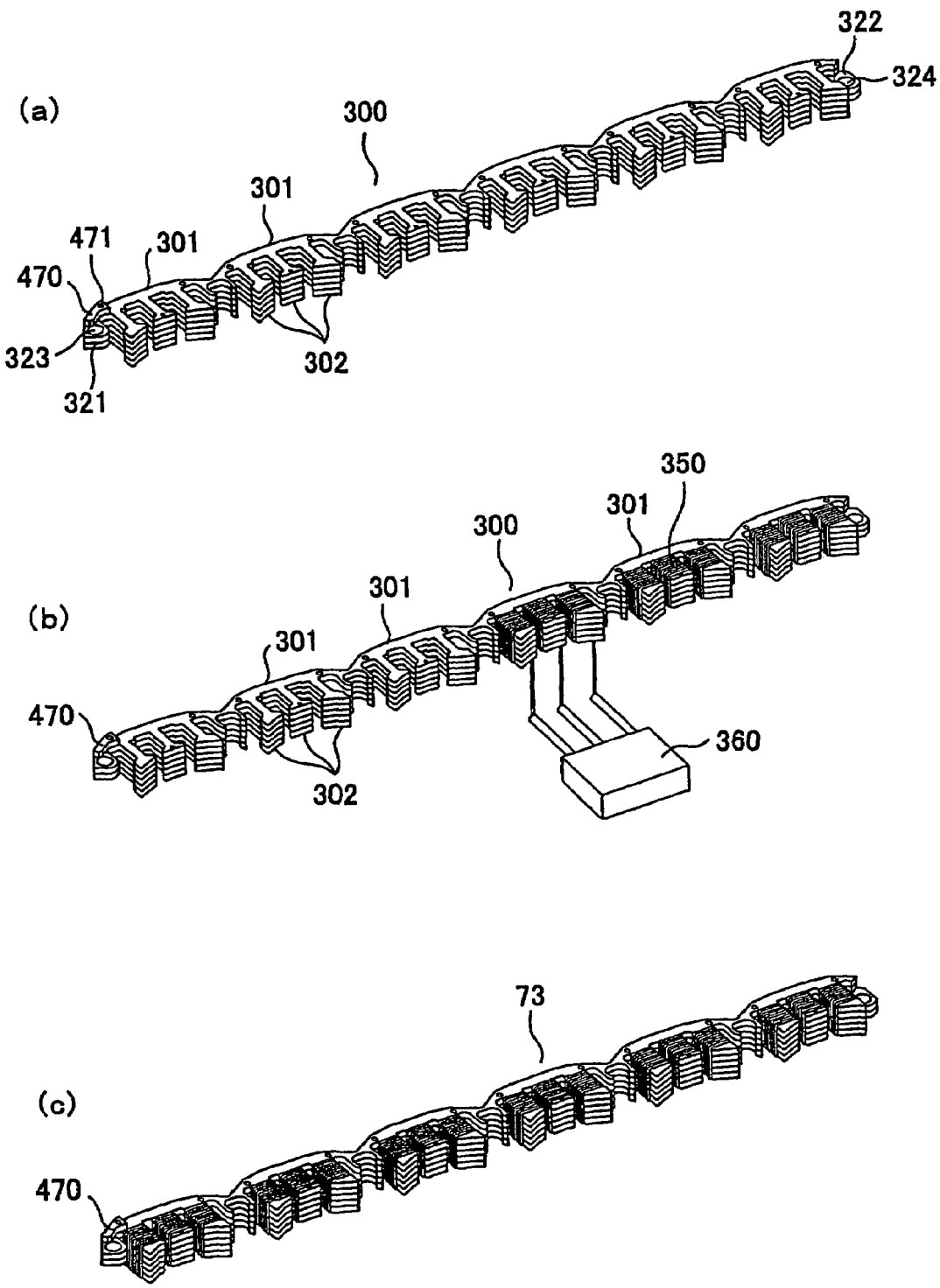
FIG. 43 is a perspective view showing the steps in which the driving coils are wound around the stator core divided from the stacked stator cores.

In FIGS. 41 and 42, reference numeral 401 denotes the stator core connecting portion. In the sheet magnetic materials provided on one end side of the stator core connecting portion 401 and placed on yoke members 301, a connecting leaf 470 having the similar shape to that of bent portion 304 is connected with a yoke member 301 by a caulking 471, and the opposing end (opposing the connecting leaf 470) is made up of magnetic pole teeth 302 and a yoke 303 forming the yoke member 301. In other words, the connecting leaf 470 functions as an interconnecting portion. Such an arrangement as mentioned above brings about the state shown in FIG. 43, when a stator core 300 is divided from the stacked stator core 50 at the stator core connecting portion 401. That is, although the connecting leaf 470 yet remains at the end of the stator core 300, there is provided no difference in level between yoke members 301 in the part of magnetic pole teeth 302 around which the driving coils 350 are wound. Therefore, a slim stator 73 having no difference in level can be provided, even through the stacked stator core 50 is used.

Sixth Embodiment

In the above second and fourth embodiments, the bent portion 304 is formed at the part having a thickness thinner than that of yoke 303 made up of the yoke member 301. Alternatively, a bent portion that is more easily bent will next be described with reference to FIGS. 44 to 46.

Figure 44:
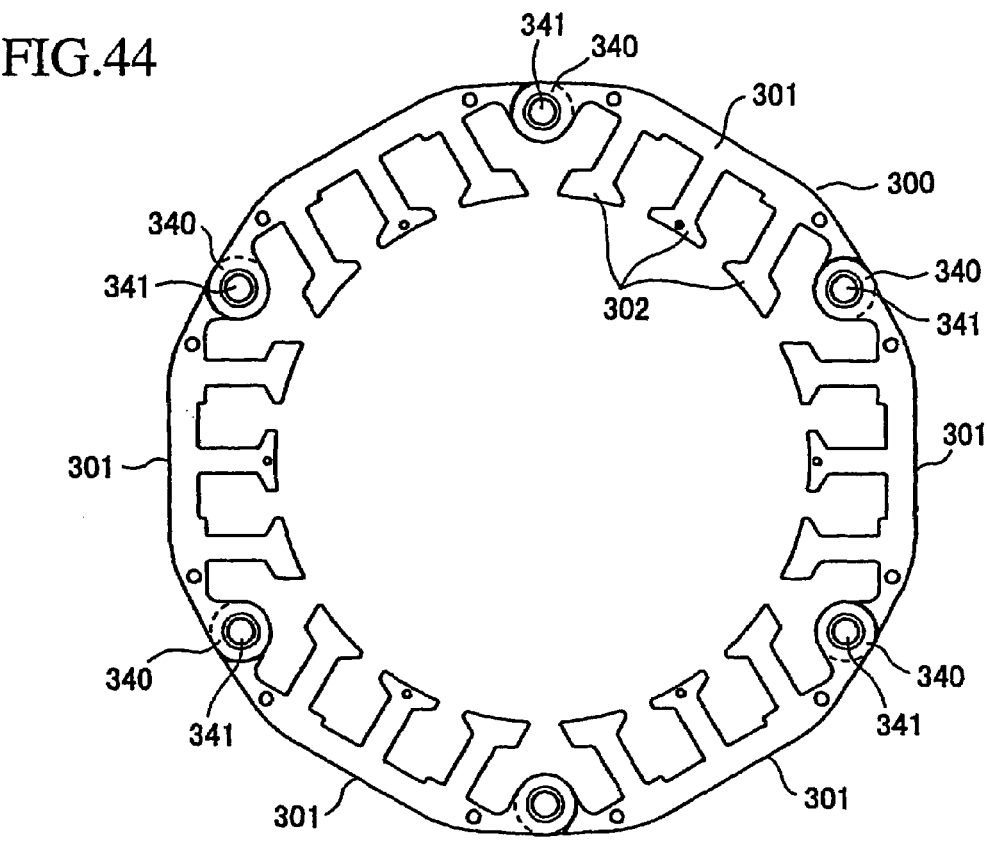
FIG. 44 is a plan view showing the state in which the stator core is formed in a ring.
Figure 45:
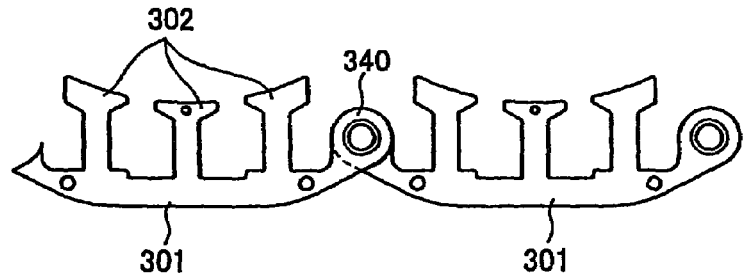
FIG. 45 is a partial plan view showing the state in which the yoke members are unfolded at the bent portion.
Figure 46:
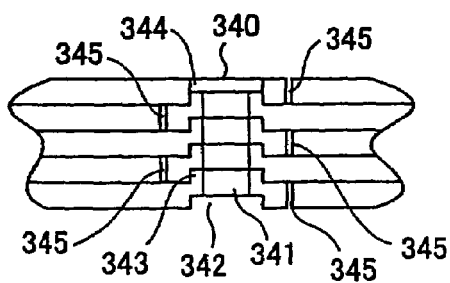
FIG. 46 is a sectional view of the bent portion.

FIG. 44 is a plan view showing the state in which the stator core 300 is arranged in a ring. FIG. 45 is a partial plan view showing the state in which the yoke member 301 is unfolded in the bent portion. FIG. 46 is a sectional view of the bent portion. Like or equivalent members as that of the second and fourth embodiments are given like reference numerals and thus the description thereof is omitted for brevity's sake.

In FIGS. 44 to 46, reference numeral 340 denotes a bent portion connecting yoke members 301. In the center of the bent portion 340 positioning fastening holes 341 are provided for mounting and fixing a stator 73 on a base 71. As shown in FIG. 46, one to four layers of sheet magnetic materials are stacked such that recesses 342 and protrusions 343 formed by half blanking the stacked sheet magnetic materials so as to engage each other. In the fifth layer of sheet magnetic material (the uppermost layer in FIG. 46) is provided a hole 344 engaging with the protrusions 343 formed in the fourth layer of sheet magnetic material. In addition, in the sheet magnetic materials of each layer are provided gaps 345 having a prescribed width in the vicinity of bent portions 340 so as for the bent portions 340 to be easily bent. A so-called joint structure constructed by engagement of the recesses 342 and protrusions 343 is arranged so as for yoke members 301 to be easily unfolded.

As mentioned above, letting the bent portion 340 to have a joint structure makes it possible to eliminate the fracture of the bent portion 340 due to the fatigue of bent portion 340, thereby increasing the reliability of the rotary motor 80, in the core structure like the stacked stator core 50 where it suffers from the frequent bending in the bent portion such as the unfold of stator core 300 or the restore to the original arrangement of the stator 73 in a ring.

Seventh Embodiment

A floppy disk drive unit equipped with the rotary motor 80 manufactured based on the stacked stator core 50 according to the above embodiments will now be described with reference to FIG. 47.

Figure 47:
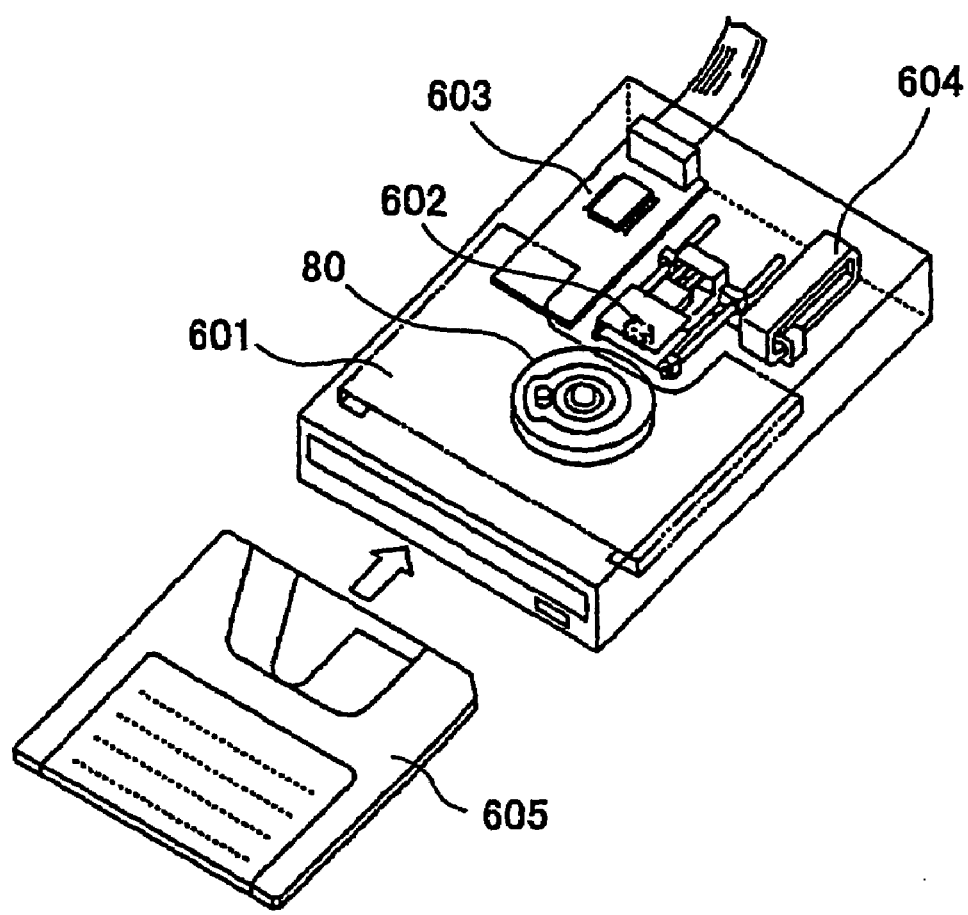
FIG. 47 is an external view of the floppy disk drive unit equipped with the rotary motor manufactured based on the stacked stator core according to the above embodiments.
Figure 48:
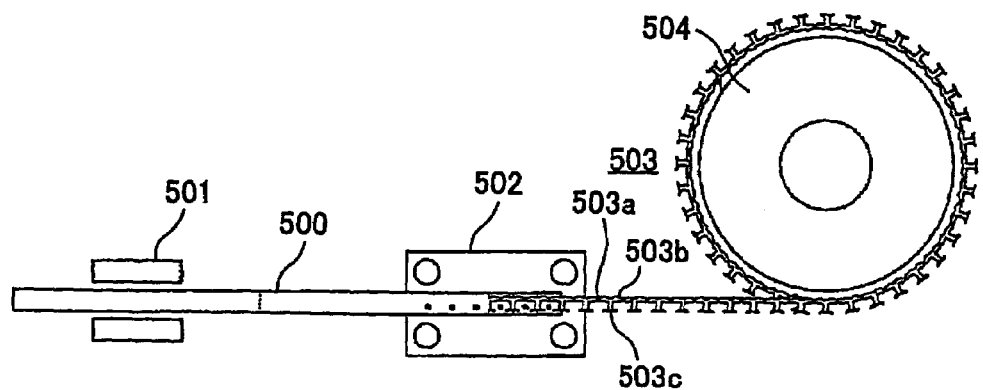
FIG. 48 is a view showing a part of steps in a conventional method of manufacturing stators.
Figure 49:
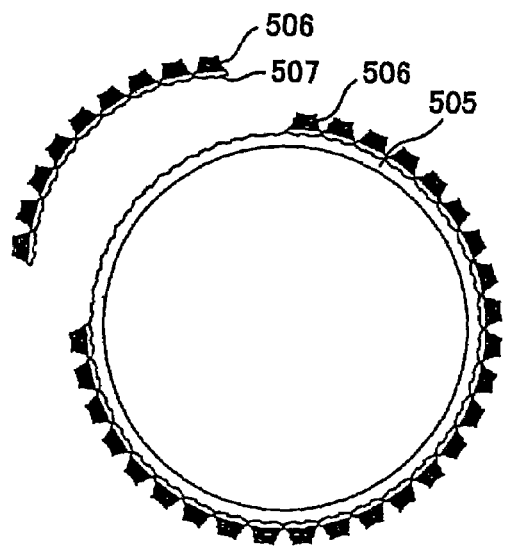
FIG. 49 is a view showing a part of steps in a conventional method of manufacturing stators.

Referring to FIG. 47, reference numeral 601 denotes a loading unit, reference numeral 602 a magnetic head, reference numeral 603 a control board, reference numeral 604 a voice coil motor, and reference numeral 605 a floppy disk, respectively.

A rotary motor 80 manufactured based on the stacked stator core 50 is mounted on the base of floppy disk drive unit nearly in the center of the disk drive unit. The magnetic record medium pivotally installed within the floppy disk 605 is rotated at a prescribed number of rotations by means of the rotating torque of the rotary motor 80. The reading and writing of data from and to such a floppy disk 605 is done via the magnetic head 602. The voice coil motor 604 causes the magnetic head 602 to seek in the radius direction of floppy disk 605. The rotary motor 80 and the voice coil motor 604 are accurately controlled by the electric circuit provided on the control board 603.

The application of the rotary motor 80 according to the present invention to the floppy disk drive unit makes it possible to slim the floppy disk drive unit and cut down the cost of the floppy disk drive unit.

The description of the above embodiment is made by way of the floppy disk drive unit. However, the similar effect may be obtained by application of the rotary motor 80 according to the present invention to other disk drive units having a drive mechanism actuated by a rotary motor, hard disk drive units, CD-ROM drive units or the like, for instance.

INDUSTRIAL APPLICABILITY

As mentioned above, the stacked stator core according to the present invention provides stacked stator cores enabling easy transportation of the materials, easy mounting onto the winding machine, easy unfolding and dividing of the stator cores for winding, and the assembly work. Further, it allows manufacture of rotary motors superior in mass productivity from the stacked stator core according to the present invention.

What is claimed is:

1. A method of manufacturing a stator, comprising the steps of:
    forming a stacked stator core including
        a) forming a first core member by stacking a prescribed number of magnetic materials and each having a plurality of yoke members connected to one another through a bendable bent portion,
        b) forming a second core member having a yoke member by stacking the prescribed number of magnetic materials and arranging the yoke member of the second core member in such a manner that one end of each magnetic material of said second core member is successively connected to the next lower magnetic material of an end of said first core member through a bendable bent portion from the next lower magnetic material of the other end of said first core member by shifting entirely said second core member downwards by one magnetic material, with the same number of magnetic materials of said second core member left unconnected as the prescribed number of magnetic materials,
        c) forming a third core member by stacking the prescribed number of magnetic materials, each of which is made up of the same number of yoke members as said first core member connected through the bendable bent portion, and connecting one end of a magnetic material of said third core member to the other end of said second core member through a bendable bent portion by shifting entirely said third core member downwards, and d) forming a fourth core member having a yoke member by stacking the prescribed number of magnetic materials and arranging the yoke member of the fourth core member in such a manner that one end of each magnetic material of said fourth core member is successively connected to a next lower magnetic material stage of the other end of said third core member through a bendable bent portion from the next magnetic material of the other end of said third core member by shifting entirely said fourth core member downwards by one magnetic material, with a same number of magnetic materials of said fourth core member left unconnected as the prescribed number of magnetic materials, wherein the first, the second, the third and the fourth core members are independently arranged in a ring and mutually stacked;

unfolding the stacked stator core straight;

subjecting the straight stacked stator core to a prescribed treatment;

winding a wire around teeth of the straight stacked stator core subjected to the prescribed treatment; and winding up the straight wire-wound stacked stator core to restore the core to its original arrangement in a ring.

2. The method of manufacturing a stator according to claim 1, wherein the prescribed treatment is electrocoating.

3. The method of manufacturing a stator according to claim 1, further comprising the step of winding-up the wire-wound stacked stator core such that the wire-wound side faces the inside of the core.

4. The method of manufacturing a stator according to claim 1, further comprising the step of winding-up the wire-wound stacked stator core such that the wire-wound side faces the outside of the core.

5. A method of manufacturing a stator, comprising the steps of:

forming a stacked stator core including a) forming a first core member by stacking a prescribed number of magnetic materials and each having a plurality of yoke members connected to one another through a bendable bent portion, b) forming a second core member having a yoke member by stacking the prescribed number of magnetic materials and arranging the yoke member of the second core member in such a manner that one end of each magnetic material of said second core member is successively connected to the next lower magnetic material of an end of said first core member through a bendable bent portion from the next lower magnetic material of the other end of said first core member by shifting entirely said second core member downwards by one magnetic material, c) forming a third core member by stacking the prescribed number of magnetic materials, each of which is made up of the same number of yoke members as said first core member connected through the bendable bent portion, and connecting one end of a magnetic material of said third core member to the other end of said second core member through a bendable bent portion by shifting entirely said third core member downwards, and d) forming a fourth core member having a yoke member by stacking the prescribed number of magnetic materials and arranging the yoke member of the fourth core member in such the manner that one end of each magnetic material of said fourth core member of the fourth core member is successively connected to a next stage lower magnetic material of the other end of said third core member through a bendable bent portion from the next lower magnetic material magnetic material of the other end of said third core member by shifting entirely said fourth core member downwards by one magnetic material, with a same number of magnetic materials of said fourth core member left unconnected as the prescribed number of magnetic materials, wherein the first, the second, the third and the fourth core members are continuously arranged in a shape of a spiral, wherein the third core is stacked on the first core and the fourth core is stacked on the second core;

unfolding the stacked stator core straight;

subjecting the straight stacked stator core to a prescribed treatment;

winding a wire around teeth of the straight stacked stator core subjected to the prescribed treatment; and winding up the straight wire-wound stacked stator core to restore the core to its original arrangement in a ring.

6. The method of manufacturing a stator according to claim 5, wherein the prescribed treatment is electrocoating.

7. The method of manufacturing a stator according to claim 5, wherein the wire-wound stacked stator core is wound up such that the wire-wound side faces the inside of the core.

8. The method of manufacturing a stator according to claim 5, wherein the wire-wound stacked stator core is wound up such that the wire-wound side faces the outside of the core.

* * * * *

UNITED STATES PATENT AND TRADEMARK OFFICE
CERTIFICATE OF CORRECTION

PATENT NO. : 7,185,418 B2 Page 1 of 1
APPLICATION NO. : 10/673320
DATED : March 6, 2007
INVENTOR(S) : Nobuaki Miyake et al.

It is certified that error appears in the above-identified patent and that said Letters Patent is hereby corrected as shown below:

Claim 1, Column 19, Line 9: delete "stage".

Claim 5, Column 20, Line 16: change "the" to --a--.

Claim 5, Column 20, Line 18: delete "of the fourth core member".

Claim 5, Column 20, Line 19: delete "stage".

Claim 5, Column 20, Line 21: delete "lower magnetic".

Claim 5, Column 20, Line 22: delete "material" (first occurrence).

Signed and Sealed this

Twenty-second Day of May, 2007

JON W. DUDAS
*Director of the United States Patent and Trademark Office*